United States Patent
Amerga et al.

(10) Patent No.: US 9,294,989 B2
(45) Date of Patent: Mar. 22, 2016

(54) METHOD AND AN APPARATUS TO OPTIMIZE MONITORING FOR A NEW EMBMS SESSION IN LTE NETWORKS

(75) Inventors: Daniel Amerga, San Diego, CA (US); Muhammad Imran, San Diego, CA (US); Giri Kapalli, San Diego, CA (US); Kuo-Chun Lee, San Diego, CA (US); Shailesh Maheshwari, San Diego, CA (US); Thadi M. Nagaraj, San Diego, CA (US); Rajesh Narayanan, San Diego, CA (US); Jack S. Shauh, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 104 days.

(21) Appl. No.: 13/309,540

(22) Filed: Dec. 1, 2011

(65) Prior Publication Data
US 2013/0142053 A1 Jun. 6, 2013

(51) Int. Cl.
*H04W 48/16* (2009.01)
*H04W 4/06* (2009.01)
*H04W 76/02* (2009.01)

(52) U.S. Cl.
CPC ............... *H04W 48/16* (2013.01); *H04W 4/06* (2013.01); *H04W 76/021* (2013.01)

(58) Field of Classification Search
CPC ..... H04W 4/06; H04W 72/005; H04W 24/02; H04W 24/08; H04W 24/10; H04W 4/005; H04W 72/042; H04W 72/0446; H04W 76/002; H04W 8/22; H04W 8/24; H04W 12/04; H04W 12/06; H04W 16/22; H04W 28/02

USPC ........................ 370/432, 241, 312, 328, 352; 455/426.1; 725/62
See application file for complete search history.

(56) References Cited

U.S. PATENT DOCUMENTS

| 2005/0007971 A1 | 1/2005 | Jeong et al. | |
| 2005/0282528 A1* | 12/2005 | Charpentier | .......... H04L 12/189 455/414.2 |

(Continued)

FOREIGN PATENT DOCUMENTS

| CN | 101998271 | 3/2011 |
| WO | 2011097856 A1 | 8/2011 |

OTHER PUBLICATIONS

3rd Generation Partnership Project; Technical Specification Group Radio Access Network; Evolved Universal Terrestrial Radio Access (E-UTRA); Radio Resource Control (RRC): Protocol specification (Release 9); 3GPP TS 36.331, V9.3.0 (Jun. 2010), pp. 89-91 and 203-204, 650 Route des Lucioles-Sophia Antipolis Valbonne—France.

(Continued)

*Primary Examiner* — Raj Jain
*Assistant Examiner* — Jamaal Henson
(74) *Attorney, Agent, or Firm* — Arent Fox LLP

(57) ABSTRACT

A method, an apparatus, and a computer program product for wireless communication are provided. The apparatus is configured to monitor for a notification of MCCH information change associated with an MBSFN area without having previously performed an MCCH information acquisition procedure to acquire MCCH information in the MBSFN area. Furthermore, the apparatus is configured to acquire the MCCH information while monitoring for the notification of the MCCH information change that indicates a change of MCCH information.

44 Claims, 17 Drawing Sheets

(56) References Cited

U.S. PATENT DOCUMENTS

| | | | |
|---|---|---|---|
| 2007/0124774 A1* | 5/2007 | Roberts et al. | 725/62 |
| 2011/0081854 A1* | 4/2011 | Kuo | H04W 72/005 455/3.01 |
| 2011/0103288 A1 | 5/2011 | Lee et al. | |
| 2011/0188440 A1* | 8/2011 | Wang | H04W 72/005 370/312 |
| 2011/0194428 A1 | 8/2011 | Wang et al. | |
| 2011/0216686 A1* | 9/2011 | Wu | H04H 20/71 370/312 |
| 2011/0274025 A1* | 11/2011 | Hsu | H04W 72/005 370/312 |
| 2012/0039233 A1* | 2/2012 | Kim | H04W 72/005 370/312 |
| 2012/0230347 A1* | 9/2012 | Gao et al. | 370/432 |
| 2012/0314642 A1* | 12/2012 | Xu | 370/312 |

OTHER PUBLICATIONS

International Search Report and Written Opinion—PCT/US2012/065714—ISA/EPO—Jan. 30, 2013.

LTE: Evolved Universal Terrestrial Radio Access (E-UTRA), Radio Resource Control (RRC), Protocol specification (3GPP TS 36.331 version 10.0.0 Release 10), Technical Specification, European Telecommunications Standards Institute (ETSI) , 650, Route Des Lucioles; F-06921, Sophia-Antipolis, France, vol. 3GPP RAN 2, No. V10.0.0, Jan. 1, 2011, XP014062152.

Nokia Siemens Networks et al: "MCCH change notification", 3GPP Draft; R2-074968_Notification, 3rd Generation Partnership Project (3GPP), Mobile Competence Centre; 650, Route Des Lucioles; F-06921 Sophia-Antipolis Cedex; France, vol. RAN WG2, no. Jeju; Nov. 12, 2007, XP050137459, [retrieved on Nov. 12, 2007].

* cited by examiner

METHOD AND AN APPARATUS TO OPTIMIZE MONITORING FOR A NEW EMBMS SESSION IN LTE NETWORKS

BACKGROUND

1. Field

The present disclosure relates generally to communication systems, and more particularly, to optimizing the monitoring of a new evolved Multimedia Broadcast Multicast Service (eMBMS) session in Long Term Evolution (LTE) networks.

2. Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). It is designed to better support mobile broadband Internet access by improving spectral efficiency, lower costs, improve services, make use of new spectrum, and better integrate with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus monitors for a notification of a change of multicast/broadcast control information associated with a multicast/broadcast area without having previously acquired the multicast/broadcast control information. Furthermore, the apparatus acquires the multicast/broadcast control information while monitoring for the notification of the change of the multicast/broadcast control information.

DETAILED DESCRIPTION

Figure 1:
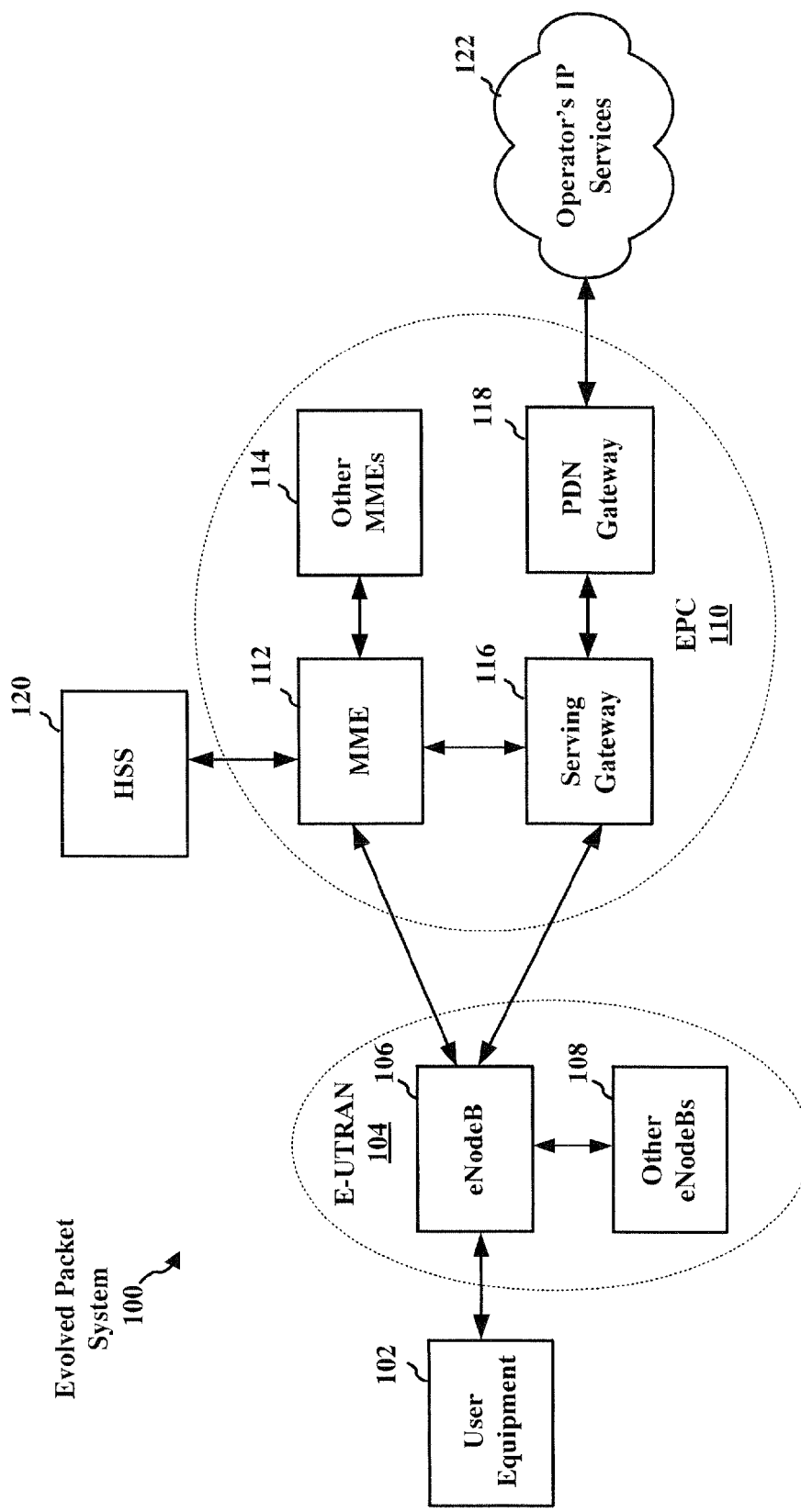
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, a Home Subscriber Server (HSS) 120, and an Operator's IP Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108. The eNB 106 provides user and control planes protocol terminations toward the UE 102. The eNB 106 may be connected to the other eNBs 108 via an X2 interface (e.g., backhaul). The eNB 106 may also be referred to as a base station, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected by an S1 interface to the EPC 110. The EPC 110 includes a Mobility Management Entity (MME) 112, other MMEs 114, a Serving Gateway 116, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 is connected to the Operator's IP Services 122. The Operator's IP Services 122 may include the Internet, the Intranet, an IP Multimedia Subsystem (IMS), and a PS Streaming Service (PSS).

Figure 2:
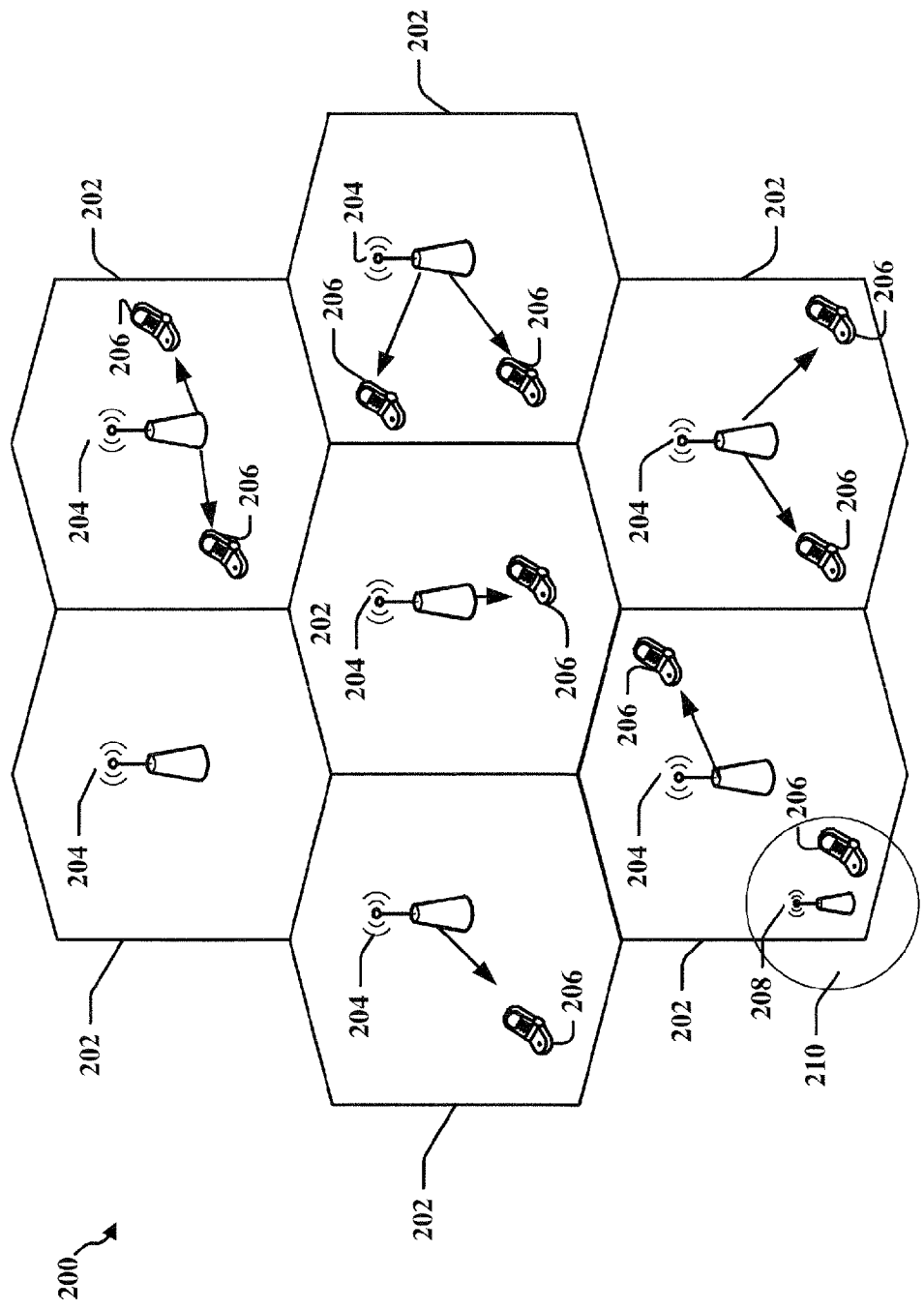
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. A lower power class eNB 208 may be referred to as a remote radio head (RRH). The lower power class eNB 208 may be a femto cell (e.g., home eNB (HeNB)), pico cell, or micro cell. The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116.

The modulation and multiple access scheme employed by the access network 200 may vary depending on the particular telecommunications standard being deployed. In LTE applications, OFDM is used on the DL and SC-FDMA is used on the UL to support both frequency division duplexing (FDD) and time division duplexing (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data steams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
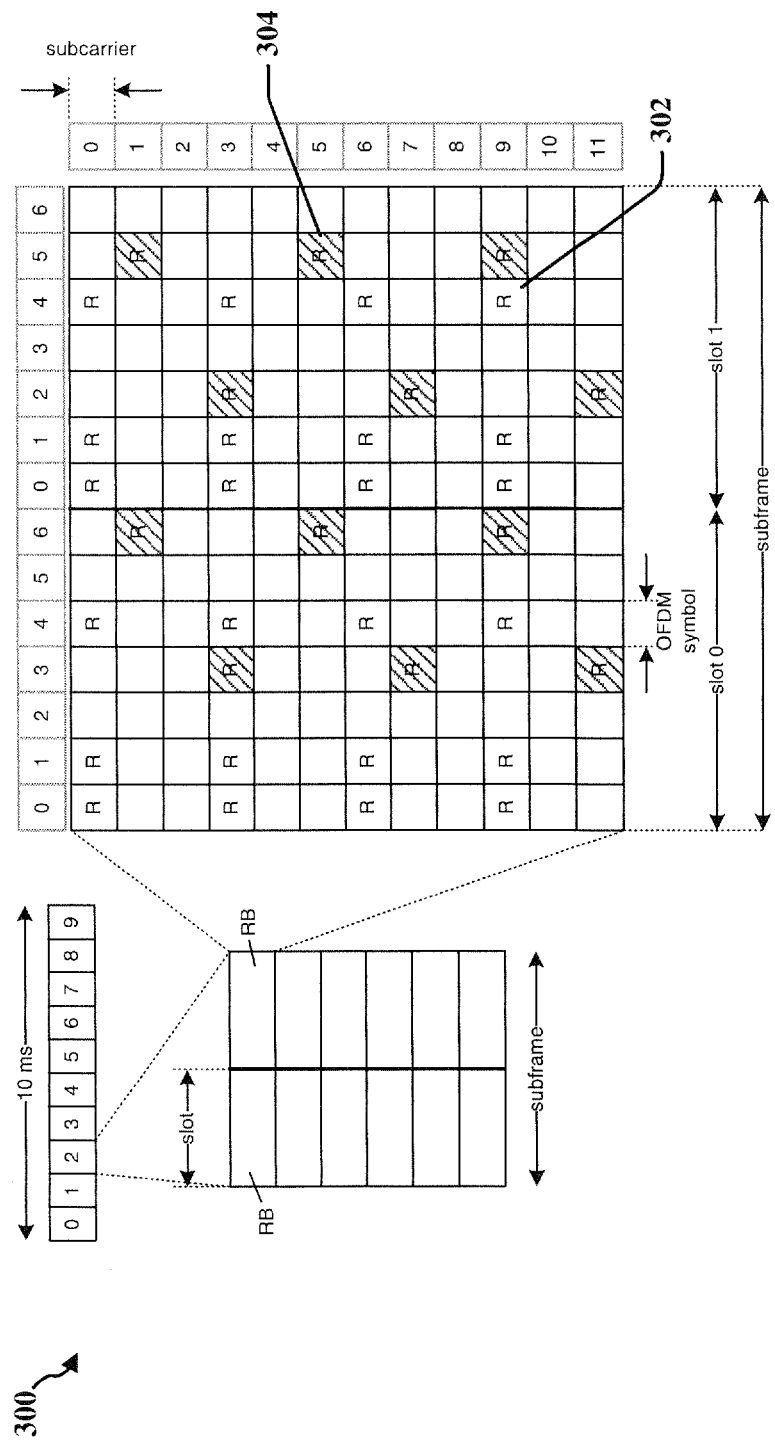
FIG. 3 is a diagram illustrating an example of a DL frame structure in LTE.

FIG. 3 is a diagram 300 illustrating an example of a DL frame structure in LTE. A frame (10 ms) may be divided into 10 equally sized sub-frames. Each sub-frame may include two consecutive time slots. A resource grid may be used to represent two time slots, each time slot including a resource block. The resource grid is divided into multiple resource elements. In LTE, a resource block contains 12 consecutive subcarriers in the frequency domain and, for a normal cyclic prefix in each OFDM symbol, 7 consecutive OFDM symbols in the time domain, or 84 resource elements. For an extended cyclic prefix, a resource block contains 6 consecutive OFDM symbols in the time domain and has 72 resource elements. Some of the resource elements, as indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
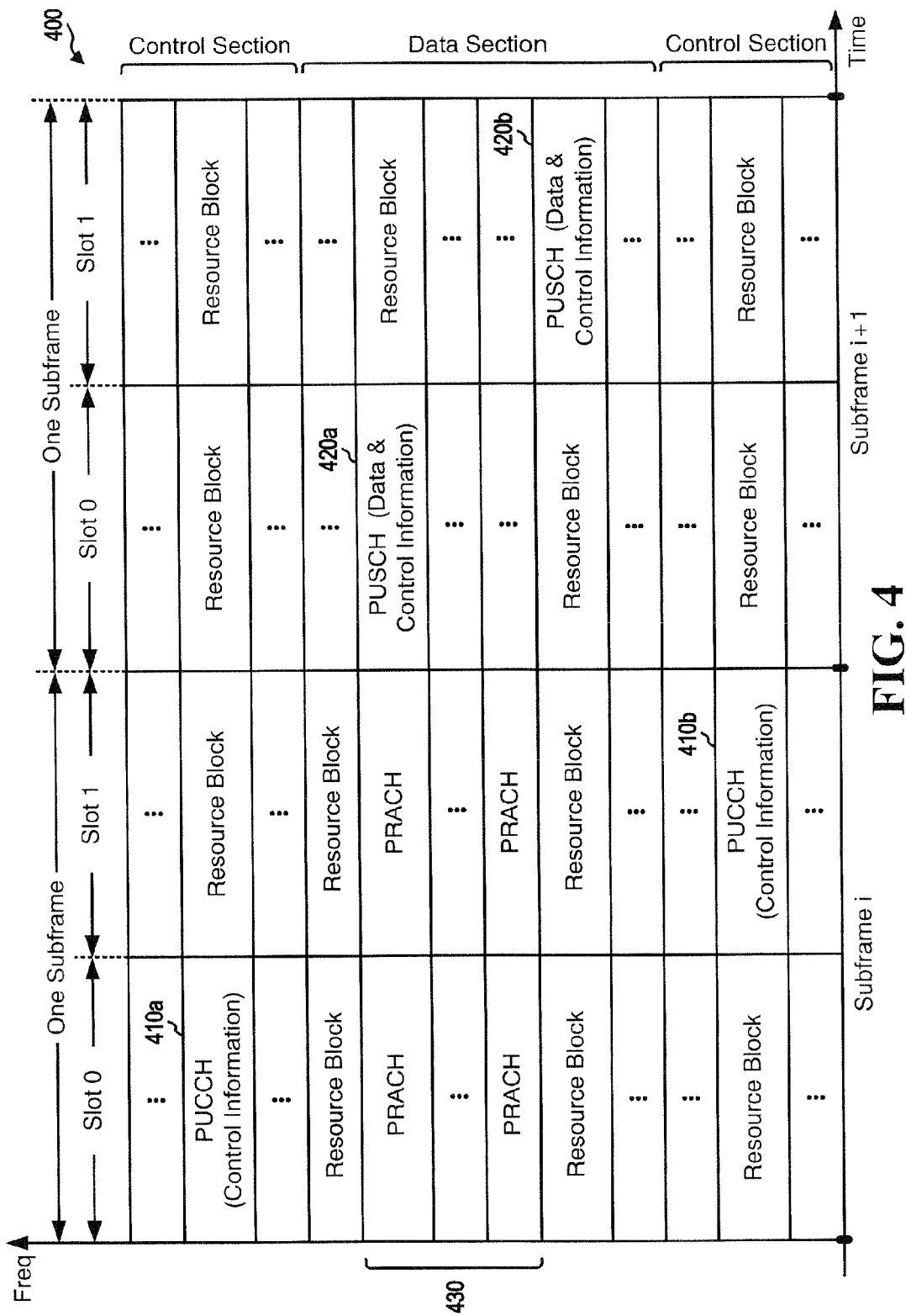
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
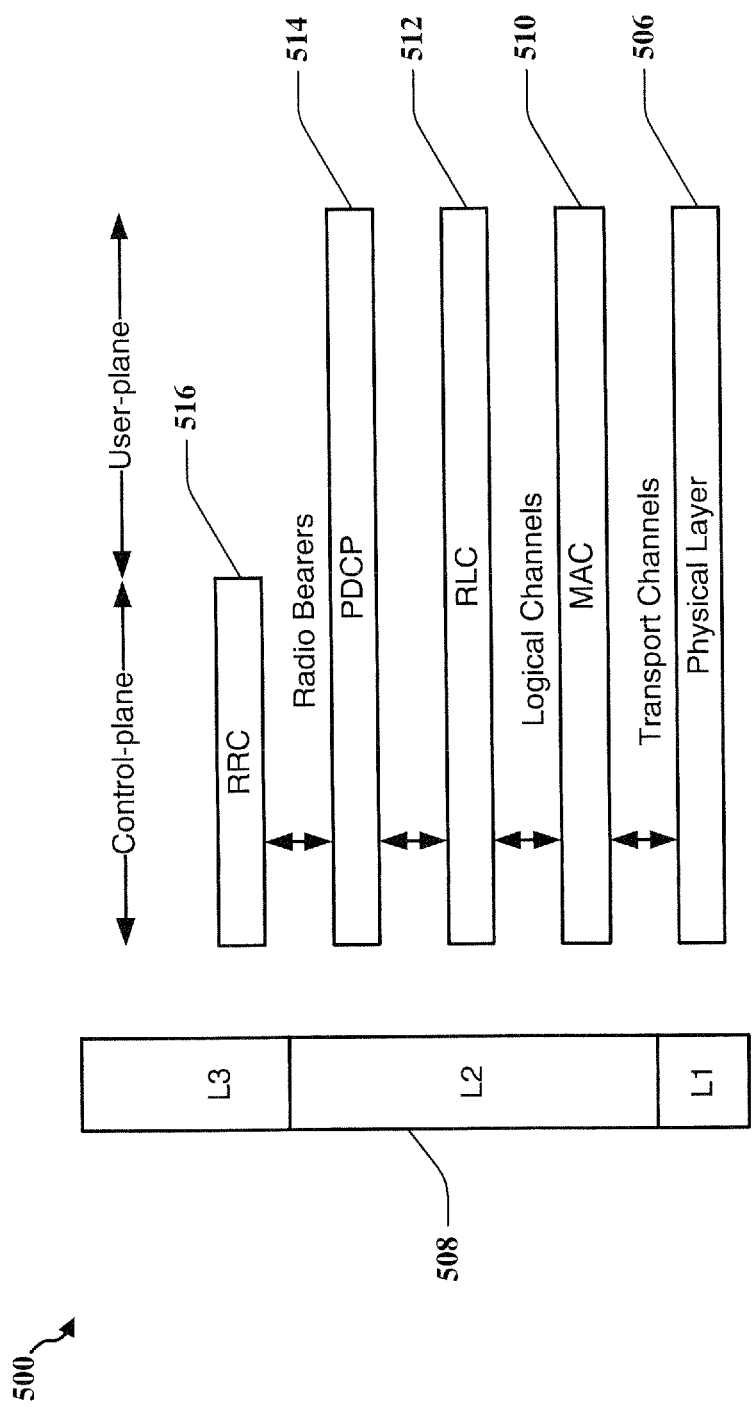
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARQ). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (i.e., radio bearers) and for configuring the lower layers using RRC signaling between the eNB and the UE.

Figure 6:
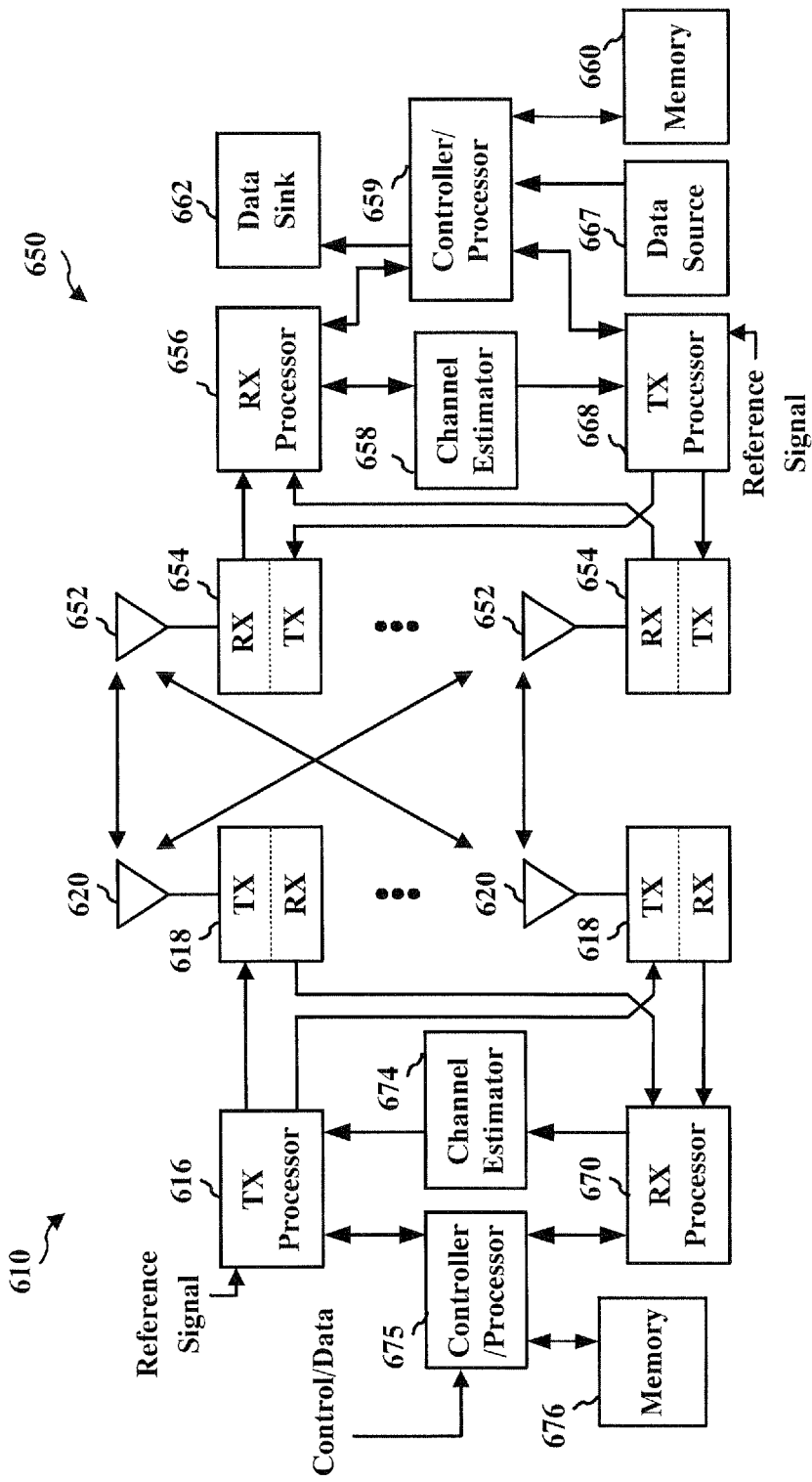
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions includes coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream is then provided to a different antenna 620 via a separate transmitter 618TX. Each transmitter 618TX modulates an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656. The RX processor 656 implements various signal processing functions of the L1 layer. The RX processor 656 performs spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, is recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the control/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 are provided to different antenna 652 via separate transmitters 654TX. Each transmitter 654TX modulates an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or MACK protocol to support HARQ operations.

Figure 7:
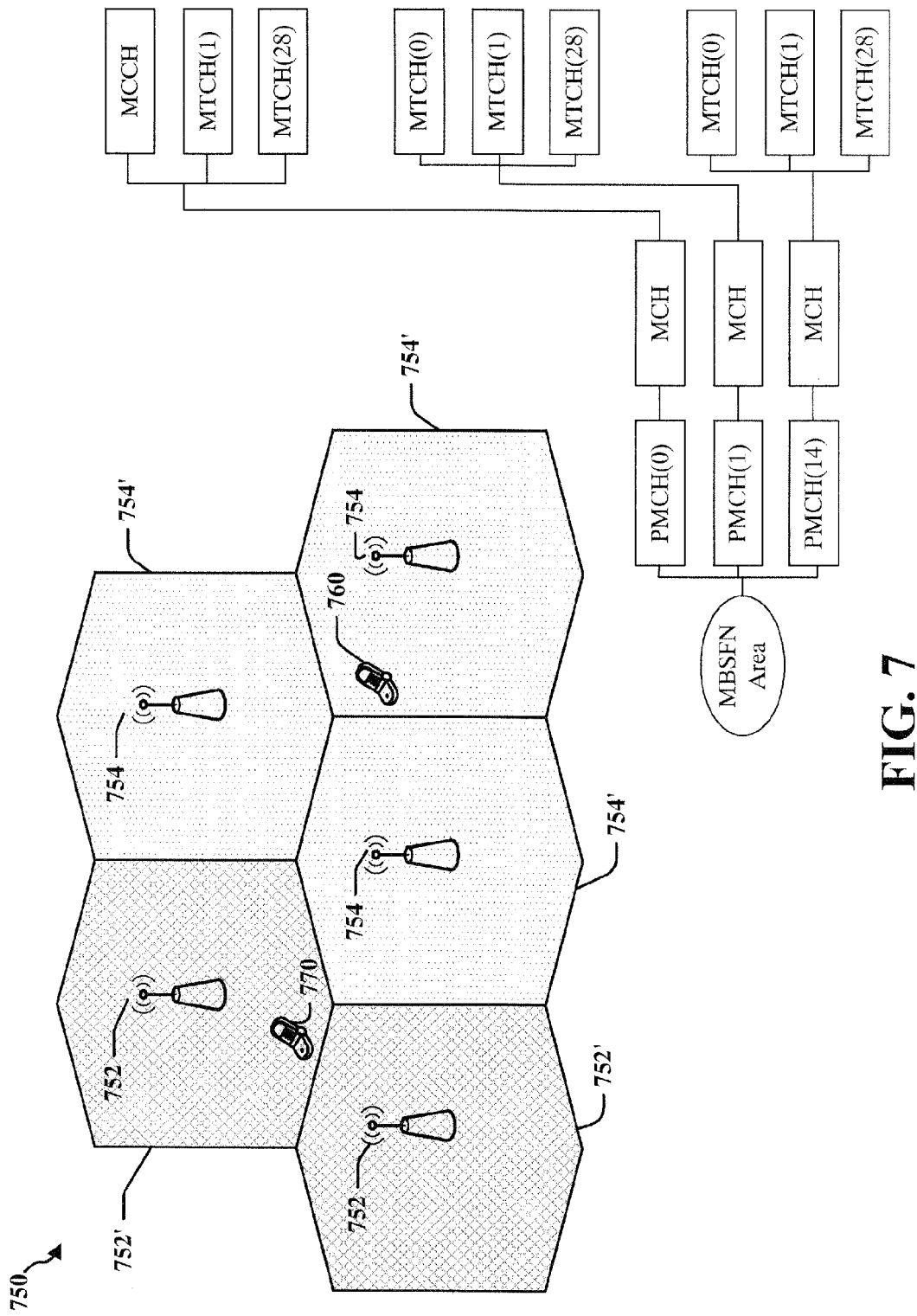
FIG. 7 is a diagram illustrating evolved Multicast Broadcast Multimedia Service in a Multi-Media Broadcast over a Single Frequency Network.

FIG. 7 is a diagram 750 illustrating evolved Multicast Broadcast Multimedia Service (eMBMS) in a Multi-Media Broadcast over a Single Frequency Network (MBSFN). The eNBs 752 in cells 752' may form a first MBSFN area and the eNBs 754 in cells 754' may form a second MBSFN area. The eNBs 752, 754 may be associated with other MBSFN areas, for example, up to a total of eight MBSFN areas. A cell within an MBSFN area may be designated a reserved cell. Reserved cells do not provide multicast/broadcast content, but may be time-synchronized to the cells 752', 754' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

Figure 8:
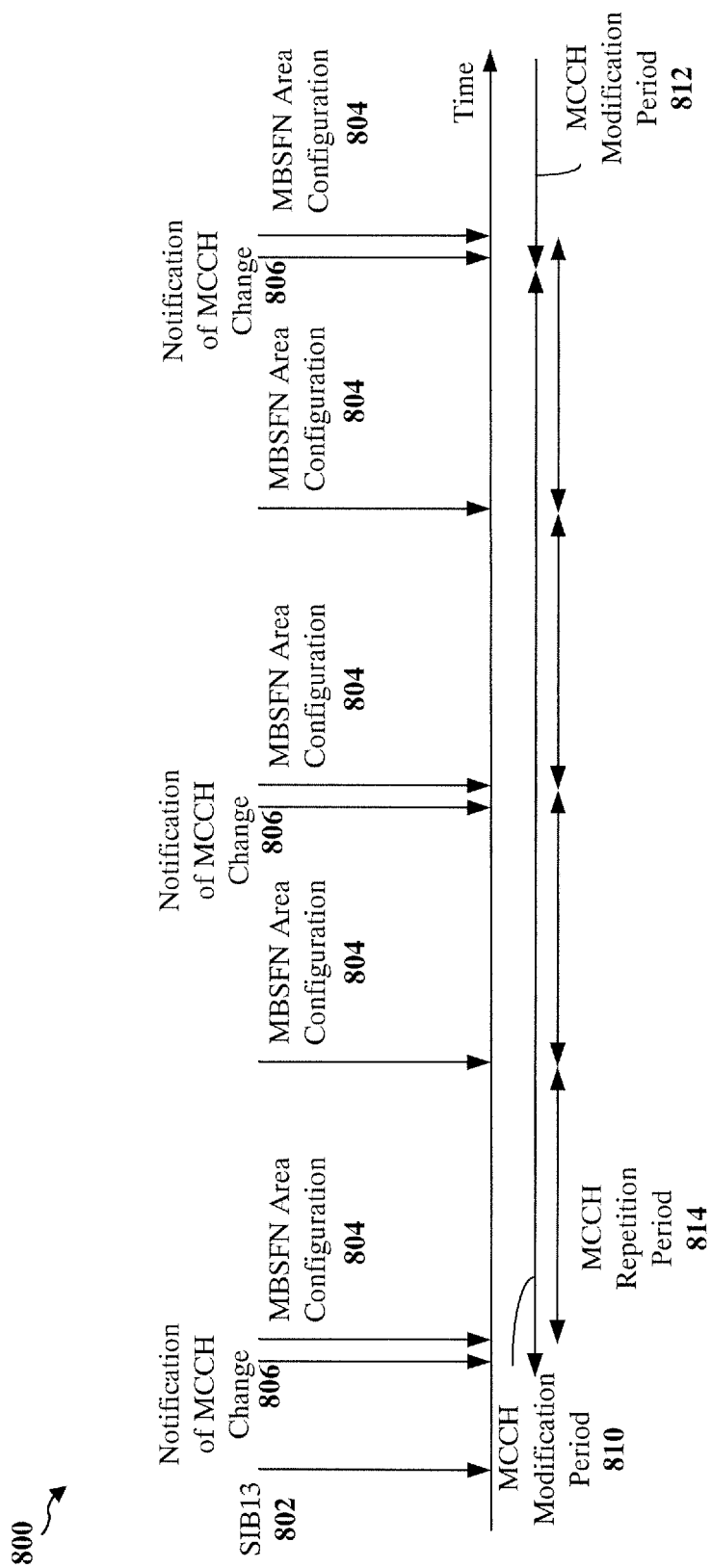
FIG. 8 is a diagram for illustrating the reception of some eMBMS content.

FIG. 8 is a diagram 800 for illustrating the reception of some eMBMS content. The eMBMS content includes control/system information such as a system information block 13 (SIB13), MCCH, MCH scheduling information (MSI), and notification of MCCH information change messages; traffic data such as MTCH(s); and other eMBMS related content. As shown in FIG. 8, a UE receives a SIB13 802. The SIB13 may indicate the MBSFN area identifier (ID) of each MBSFN supported by the cell, non-MBSFN region length (1 or 2 symbols) per MBSFN area, an MCCH configuration per MBSFN area for receiving the MCCH and the MBSFN area configuration message 804 in the MCCH, and notification information for receiving the notification of MCCH information change 806. The MBSFN area configuration message 804 may indicate a temporary mobile group identity (TMGI) and an optional session identifier of each MTCH for an eMBMS session within the PMCH; allocated resources (i.e., radio frames and subframes) for transmitting each PMCH of the MBSFN area and the allocation period (e.g., 4, 8, . . . , 256 frames) of the allocated resources for all the PMCHs in the MBSFN area; and an MCH scheduling period (e.g., 8, 16, 32, or 1024 radio frames), called MSP, over which the MCH scheduling information (MSI) MAC control element is transmitted once in that MSP. The MBSFN area configuration message 804 may be received each MCCH repetition period 814. The notification of MCCH information change 806 and the MBSFN area configuration 804 messages received in the MCCH modification period 810 apply in the subsequent MCCH modification period 812. While not shown in FIG. 8, a UE may receive MTCH(s) (i.e., traffic data) along with eMBMS control/system information.

A UE interested in receiving an eMBMS session (also referred to as an eMBMS service) applies an MCCH information acquisition procedure to obtain the MBSFN area configuration message 804 upon entering a corresponding MBSFN area (e.g., upon power on, following UE mobility) and upon receiving a notification that the MCCH information has changed 806 for a subsequent MCCH modification period. However, the UE does not start monitoring for the notification that the MCCH information has changed until after obtaining an initial MBSFN area configuration message through an MCCH information acquisition procedure. Further, when the UE does monitor for the notification that the MCCH information has changed, the UE may miss the notification either by being unable to correctly decode the notification or by entering an MBSFN area during an MCCH modification period after the notification has been transmitted in that MCCH modification period. Methods and an apparatus are provided infra for addressing issues related to the monitoring of a new eMBMS session for LTE eMBMS or otherwise optimizing the monitoring of a new eMBMS session for LIE eMBMS.

Figure 9:
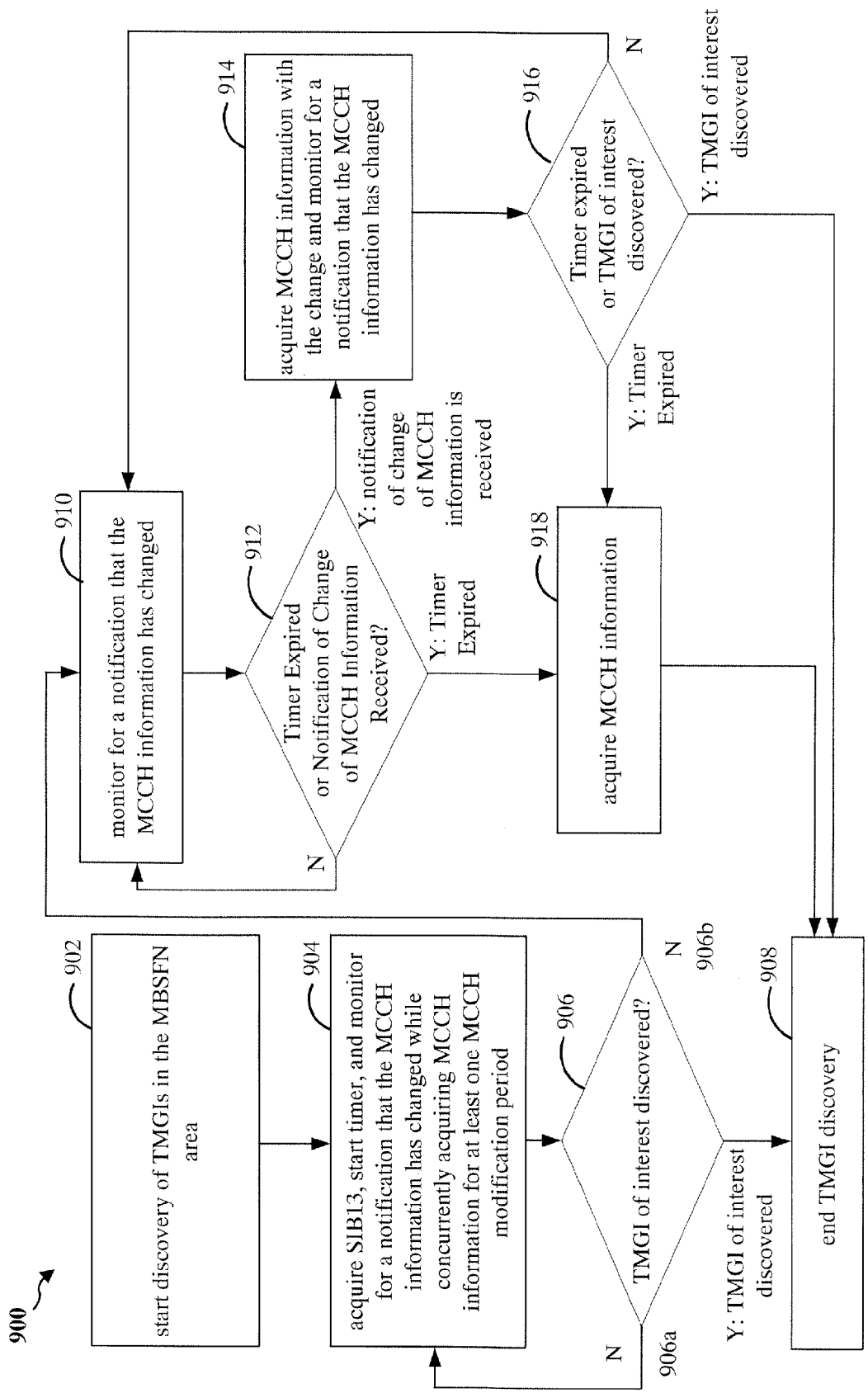
FIG. 9 is a flow chart of a method of optimizing the monitoring of a new eMBMS session.

FIG. 9 is a flow chart 900 of a method of optimizing the monitoring of a new eMBMS session. In step 902, the UE starts the discovery of one or more TMGIs associated with one or more eMBMS sessions of interest. The UE may perform step 902 upon entering into an MBSFN area. The UE may also perform step 902 when already in an MBSFN area if the UE has not yet acquired MCCH information and monitored for a notification that the MCCH information has changed within the MBSFN area. In step 904, the UE acquires the SIB13 in order to determine the MBSFN areas that are available and starts a timer for terminating the TMGI discovery process. The timer may be a clock that counts up to a specific value, counts down to a specific value, or otherwise triggers the termination of the TMGI discovery process after a predetermined time period. In addition, the UE performs one or more MCCH information acquisition procedures based on available MBSFN areas to acquire all the MCCH information during at least one MCCH modification period while concurrently monitoring for a notification that the MCCH information has changed. In step 906, the UE determines from the acquired MCCH information whether any of the TMGIs are of interest. If one or more TMGIs are of interest, in step 908, the UE ends TMGI discovery. If no TMGIs are of interest and the UE has not acquired MCCH information for at least one full MCCH modification period (e.g., one or more full MCCH modification periods), the UE returns 906a to step 904. If no TMGIs are of interest and the UE has acquired MCCH information for at least one full MCCH modification period, the UE goes 906b to step 910, and the UE monitors for a notification that the MCCH information has changed. The UE performs step 910 without performing MCCH information acquisition procedures to acquire MCCH information. In steps 910/912, the UE continues to monitor for a notification that the MCCH information has changed until a notification is received or the timer expires. If the timer expires, in step 918, the UE acquires all the MCCH information and determines from the acquired MCCH information whether any of the TMGIs are of interest. If one or more TMGIs are of interest, the UE ends TMGI discovery (step 908) having found an eMBMS session of interest. If no TMGIs are of interest, the UE ends TMGI discovery (step 908) without having found an eMBMS session of interest. If, in step 912, a notification of change of MCCH information is received, in step 914, the UE performs the MCCH information acquisition procedure in an MCCH modification period subsequent to the MCCH modification period in which the UE received the notification of change of MCCH information. In step 914, while acquiring the MCCH information, the UE monitors for a notification that the MCCH information has changed. In step 916, the UE determines from the acquired MCCH information whether any of the TMGIs are of interest. If no TMGIs are of interest, the UE returns to step 910 and continues monitoring for a notification that the MCCH information has changed. If one or more TMGIs are of interest, the UE ends TMGI discovery (step 908) having found an eMBMS session of interest. If in step 916 the timer expires prior to determining a TMGI of interest, in step 918, the UE acquires the MCCH information and determines from the acquired MCCH information whether any of the TMGIs are of interest. If one or more TMGIs are of interest, the UE ends TMGI discovery (step 908) having found an eMBMS session of interest. If no TMGIs are of interest, the UE ends TMGI discovery (step 908) without having found an eMBMS session of interest.

Figure 10:
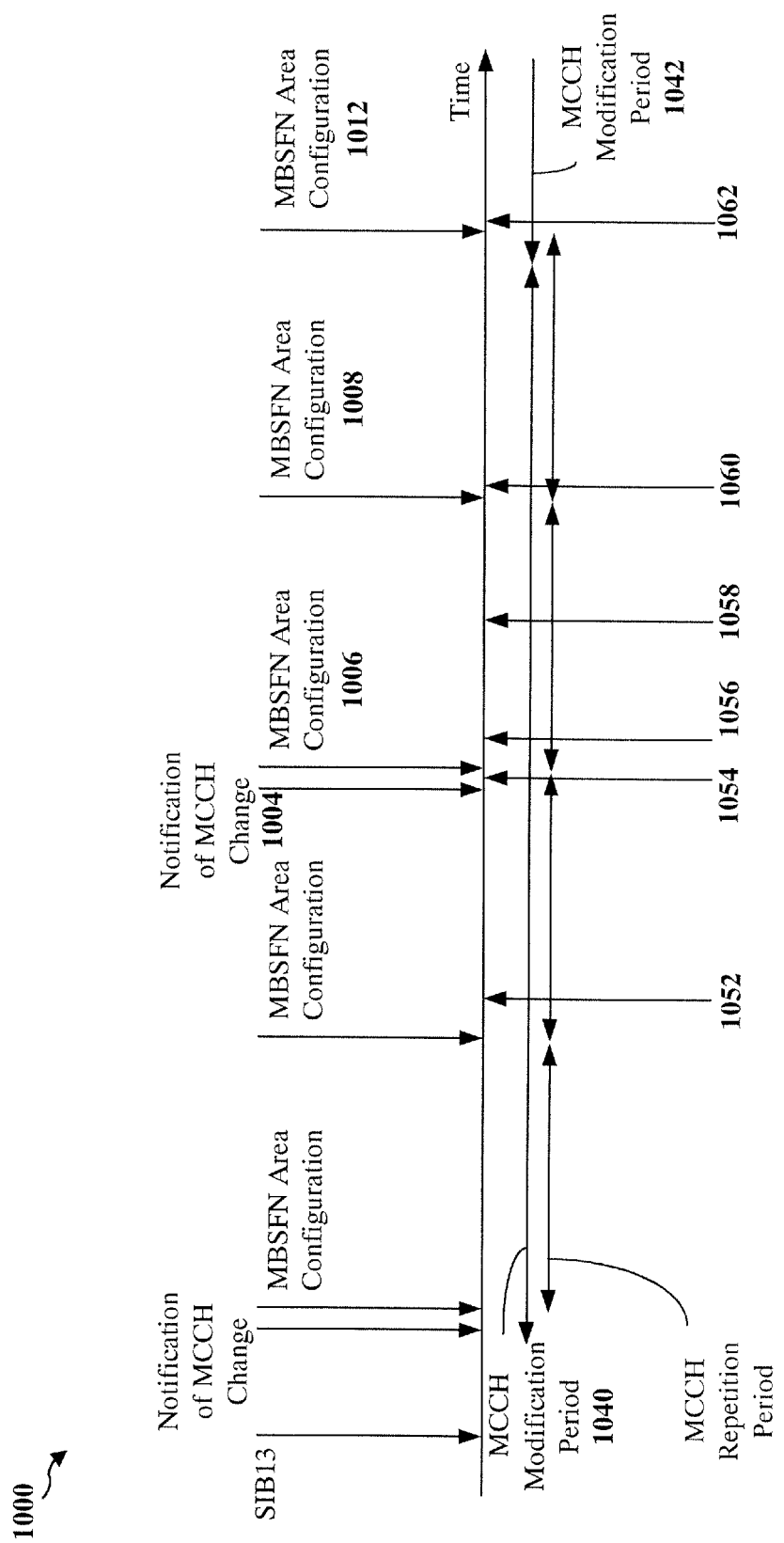
FIG. 10 is a diagram for illustrating exemplary methods.

FIG. 10 is a diagram 1000 for illustrating exemplary methods. In step 904 of FIG. 9, in order to avoid missing a notification of MCCH change, the UE monitors for a notification of MCCH information change while concurrently acquiring the MCCH information in MBSFN area configuration messages. If a UE acquires the MCCH information before monitoring for a notification of MCCH information change, the UE may miss a notification of MCCH information change. For example, as shown in FIG. 10, assume the UE enters the MBSFN area at 1052 and concurrently monitors for a notification of MCCH information change while acquiring MCCH information. At 1054, the UE detects a notification of MCCH change 1004 in the MCCH modification period 1040. The UE may then acquire 1062 the MCCH information (the MBSFN area configuration message) 1012 in the subsequent MCCH modification period 1042. However, had the UE waited to monitor for a notification of MCCH information change until after the UE acquired 1056 the MCCH information (the MBSFN area configuration message) 1006 in the MCCH modification period 1040, the UE would not have received the notification of MCCH information change 1004 in the MCCH modification period 1040, and therefore would not have determined that the MCCH information would change in the subsequent MCCH modification period 1042. That is, assume the UE enters at 1052 and does not monitor for the notification of MCCH information change 1004. The UE will acquire 1056 the MCCH information (the MBSFN area configuration message) 1006. If the UE determines that the MCCH information does not include a TMGI of interest, the UE will then begin to monitor for a notification of MCCH information change without acquiring additional MCCH information. If there is no additional notification of MCCH information change in the MCCH modification period 1040, the UE will not be able to determine that an eMBMS session of interest will start in the MCCH modification period 1042 unless the UE acquires the MCCH information in the MCCH modification period 1042. However, the UE may wait to acquire MCCH information, such as in the MCCH modification period 1042, until the UE receives a notification of MCCH information change, which the UE may or may not receive in the MCCH modification period 1042.

In another example, assume a UE enters the MBSFN area at 1058. The UE acquires 1060 the MCCH information (the MBSFN area configuration message) 1008. If the UE determines that the MCCH information (the MBSFN area configuration message) 1008 does not contain a TMGI of interest, the UE begins monitoring for a notification of MCCH information change without acquiring additional MCCH information. Because there is no additional notification of MCCH information change in the MCCH modification period 1040, the UE may miss an eMBMS session available in the subsequent MCCH modification period 1042. However, as described in FIG. 9 with respect to step 904, the UE may monitor for MCCH information for at least one full MCCH modification period, and therefore acquire 1062 the MCCH information (the MBSFN area configuration message) 1012 and determine whether the MCCH modification period 1042 carries an eMBMS session of interest.

Figure 11:
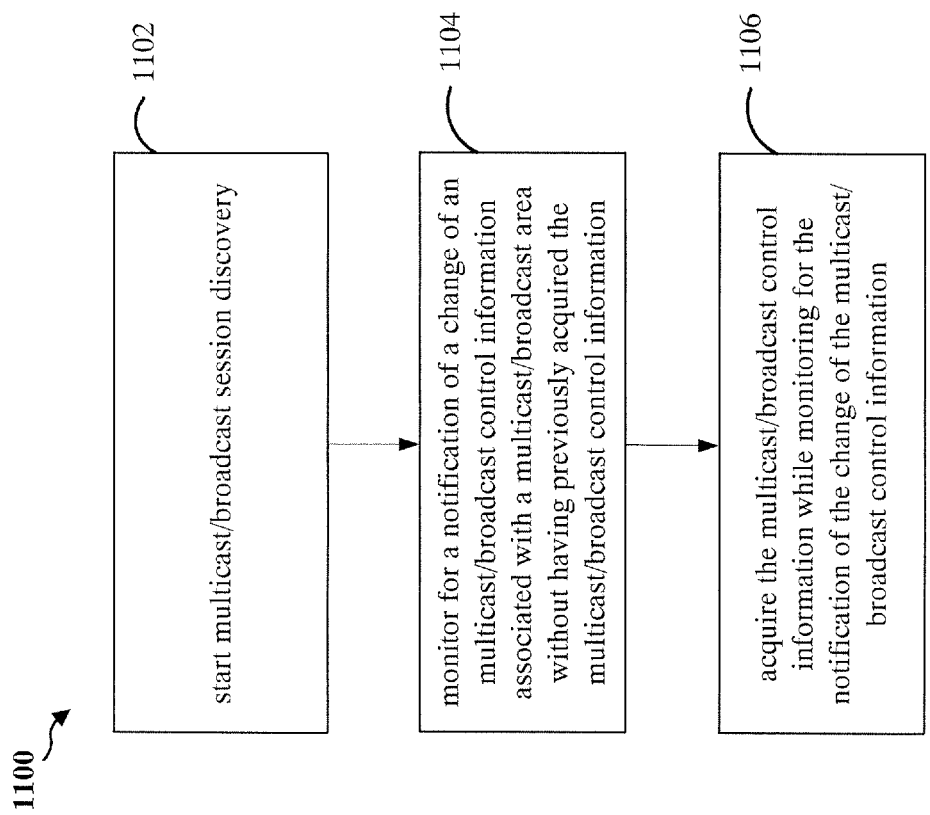
FIG. 11 is a flow chart of a first method of wireless communication.

FIG. 11 is a flow chart 1100 of a first method of wireless communication. The method may be performed by a UE. As shown in FIG. 11, in step 1102, the UE starts multicast/broadcast session discovery. The UE may start the multicast/broadcast session discovery process upon entering a multicast/broadcast area, or if already in a multicast/broadcast area, upon determining to initially acquire multicast/broadcast control information. In step 1104, the UE monitors for a notification of a change of multicast/broadcast control information associated with the multicast/broadcast area without having previously acquired the multicast/broadcast control information. In step 1106, the UE acquires the multicast/broadcast control information while monitoring for the notification of the change of the multicast/broadcast control information. The multicast/broadcast control information may be received in a multicast/broadcast area configuration (e.g., MBSFN area configuration message) message in an MCCH. The multicast/broadcast control information may be associated with a particular eMBMS session (e.g., particular news service, sports service).

For example, as shown in FIGS. 9, 10, the UE enters a multicast/broadcast area at 1052. After 1052, in step 904, the UE monitors for a notification of a change of multicast/broadcast control information associated with the multicast/broadcast area without having previously acquired the multicast/broadcast control information. As such, the UE is able to receive 1054 the notification of a change of multicast/broadcast control information 1004. In step 904, the UE acquires 1056 the multicast/broadcast control information 1006 while concurrently monitoring for the notification of the change of the multicast/broadcast control information.

Figure 12:
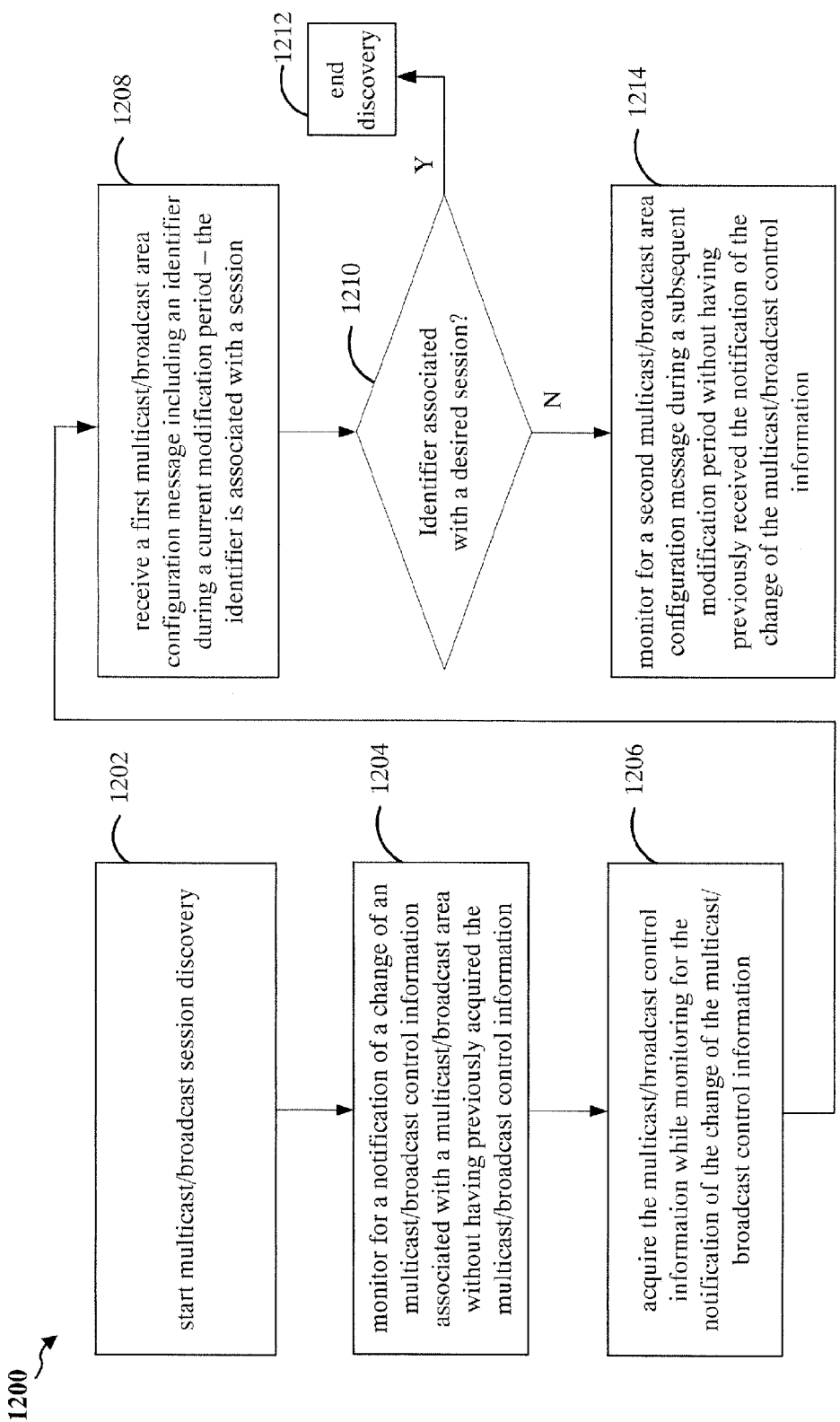
FIG. 12 is a flow chart of a second method of wireless communication.

FIG. 12 is a flow chart 1200 of a second method of wireless communication. The method may be performed by a UE. As shown in FIG. 12, in step 1202, the UE starts multicast/broadcast session discovery. The UE may start the multicast/broadcast session discovery process upon entering a multicast/broadcast area, or if already in a multicast/broadcast area, upon determining to initially acquire multicast/broadcast control information. In step 1204, the UE monitors for a notification of a change of multicast/broadcast control information associated with the multicast/broadcast area without having previously acquired the multicast/broadcast control information. In step 1206, the UE acquires the multicast/broadcast control information while monitoring for the notification of the change of the multicast/broadcast control information. In step 1208, the UE receives a first multicast/broadcast area configuration message including an identifier (e.g., TMGI) during a current modification period. The identifier is associated with a session. In step 1210, the UE determines whether the identifier is associated with a desired session. If the identifier is associated with a desired session, in step 1212, the UE ends discovery. If the identifier is unassociated with a desired session, in step 1214, the UE monitors for a second multicast/broadcast area configuration message during a subsequent modification period without having previously received the notification of the change of the multicast/broadcast control information.

For example, as shown in FIGS. 9, 10, the UE may enter a multicast/broadcast area at 1058 during the modification period 1040. After 1058, in step 904, the UE monitors for a notification of a change of multicast/broadcast control information associated with the multicast/broadcast area without having previously acquired the multicast/broadcast control information. The UE acquires 1060 the multicast/broadcast control information 1008 while monitoring for the notification of the change of the multicast/broadcast control information. The UE receives 1060 a first multicast/broadcast area configuration message 1008 including an identifier (e.g., TMGI) during a current modification period 1040. The identifier is associated with a session. In step 906, the UE determines whether the identifier is associated with a desired session. If the identifier is associated with a desired session, in step 908, the UE ends discovery. If the identifier is unassociated with a desired session, the UE returns to step 904 so as to acquire the MCCH information for at least one full MCCH modification period. In step 904, the UE monitors for a second multicast/broadcast area configuration message 1012 during a subsequent modification period 1042 without having previously received the notification of the change of the multicast/broadcast control information.

Figure 13:
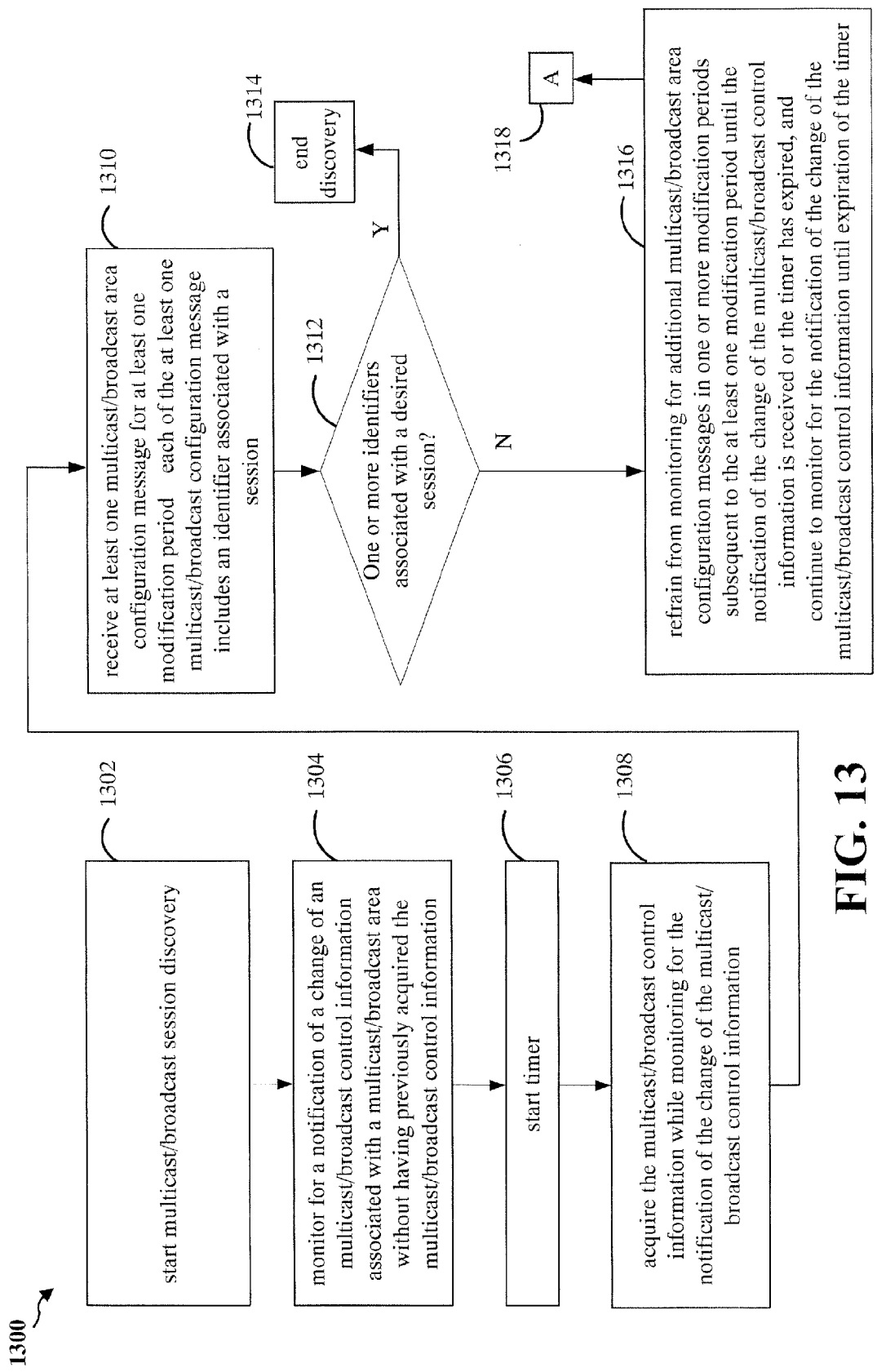
FIG. 13 is a flow chart of a third method of wireless communication.

FIG. 13 is a flow chart 1300 of a third method of wireless communication. The method may be performed by a UE. As shown in FIG. 13, in step 1302, the UE starts multicast/broadcast session discovery. The UE may start the multicast/broadcast session discovery process upon entering a multicast/broadcast area, or if already in a multicast/broadcast area, upon determining to initially acquire multicast/broadcast control information. In step 1304, the UE may monitor for a notification of a change of multicast/broadcast control information associated with the multicast/broadcast area without having previously acquired the multicast/broadcast control information. In step 1306, the UE may start a timer for terminating the discovery process. In step 1308, the UE acquires the multicast/broadcast control information while monitoring for the notification of the change of the multicast/broadcast control information. In step 1310, the UE receives at least one multicast/broadcast area configuration message for at least one modification period. Each of the at least one multicast/broadcast configuration message may include an identifier associated with a session. In step 1312, the UE determines whether each identifier is associated with a desired session. If an identifier is associated with a desired session, in step 1314, the UE ends discovery. If each identifier is unassociated with a desired session, in step 1316, the UE refrains from monitoring for additional multicast/broadcast area configuration messages in one or more modification periods subsequent to the at least one modification period. In step 1316, the UE may refrain from monitoring for the additional multicast/broadcast area configuration messages until the notification of the change of the multicast/broadcast control information is received or the timer expires, and the UE may continue to monitor for the notification of the change of the multicast/broadcast control information until expiration of the timer. After step 1316, the UE goes to the next step (point A 1318), continued with respect to FIG. 14.

For example, as shown in FIG. 9, in step 904, a UE may receive at least one multicast/broadcast area configuration message for at least one modification period. If in step 906, the UE determines that each identifier is unassociated with a desired session, in step 910, the UE refrains from monitoring for additional multicast/broadcast area configuration messages in one or more modification periods subsequent to the at least one modification period. In steps 910/912, the UE refrains from monitoring for the additional multicast/broadcast area configuration messages until the notification of the change of the multicast/broadcast control information is received or the timer expires, and continues to monitor for the notification of the change of the multicast/broadcast control information until expiration of the timer.

Figure 14:
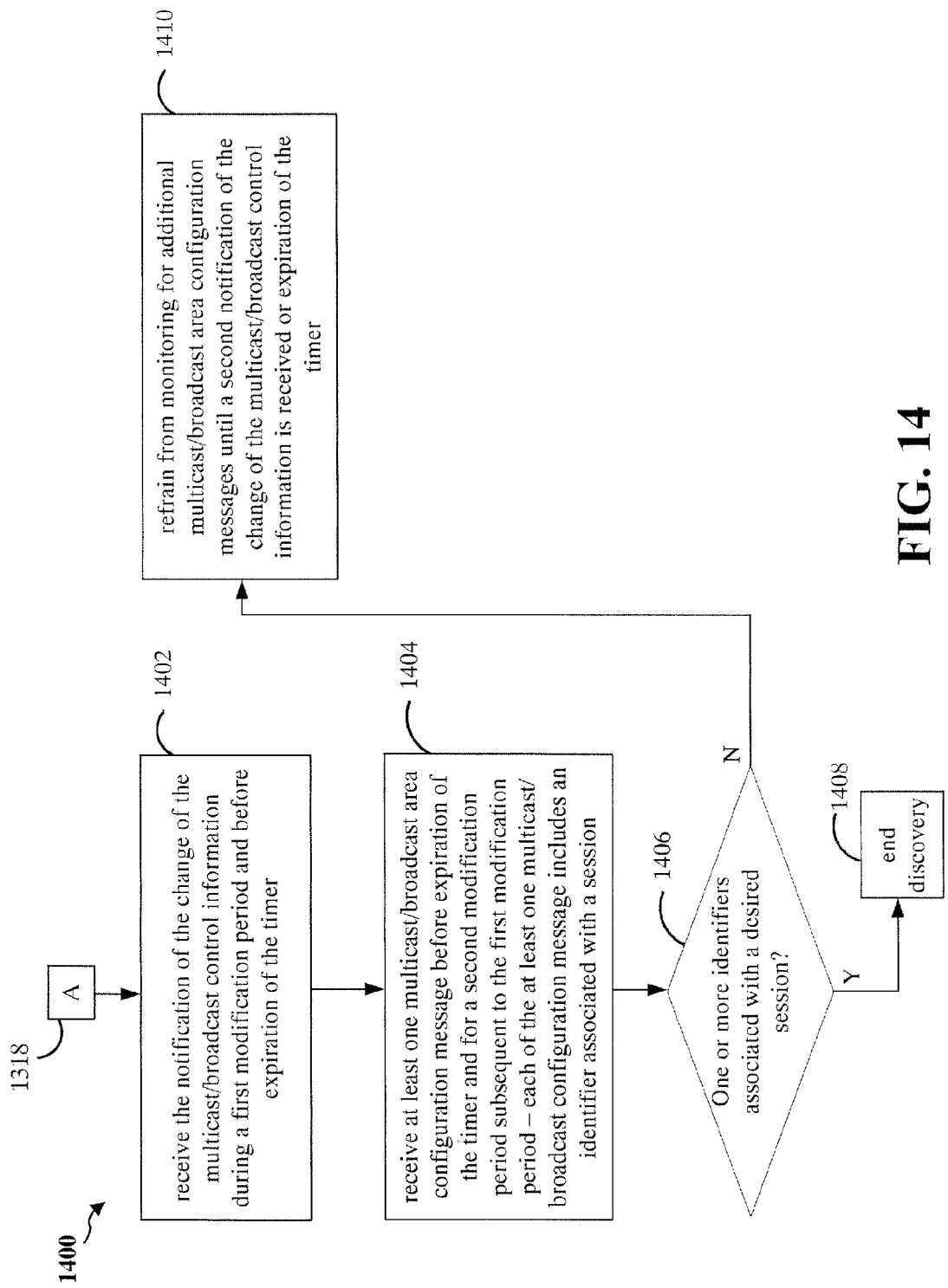
FIG. 14 is a flow chart of a fourth method of wireless communication.

FIG. 14 is a flow chart 1400 of a fourth method of wireless communication. As shown in FIG. 14, after point A 1318 continued from FIG. 13, in step 1402, the UE may receive the notification of the change of the multicast/broadcast control information during a first modification period and before expiration of the timer. In step 1404, the UE may receive at least one multicast/broadcast area configuration message before expiration of the timer and during a second modification period subsequent to the first modification period. Each of the at least one multicast/broadcast configuration message may include an identifier associated with a session. In step 1406, the UE may determine whether each identifier is associated with a desired session. If an identifier is associated with a desired session, at step 1408, the UE ends discovery. Otherwise, if each identifier is unassociated with a desired session, at step 1410, the UE refrains from monitoring for additional multicast/broadcast area configuration messages until a second notification of the change of the multicast/broadcast control information is received or expiration of the timer.

For example, as shown in FIG. 9, in steps 910/912, the UE may receive the notification of the change of the multicast/broadcast control information during a first modification period and before expiration of the timer. In 914, the UE may receive at least one multicast/broadcast area configuration message before expiration of the timer and during a second modification period subsequent to the first modification period. In step 916, the UE may determine whether each identifier is associated with a desired session. If an identifier is associated with a desired session, the UE goes to step 908, and ends discovery having found an eMBMS session of interest. Otherwise, if each identifier is unassociated with a desired session, the UE goes to step 910, and refrains from monitoring for additional multicast/broadcast area configuration messages until a second notification of the change of the multicast/broadcast control information is received or expiration of the timer.

Figure 15:
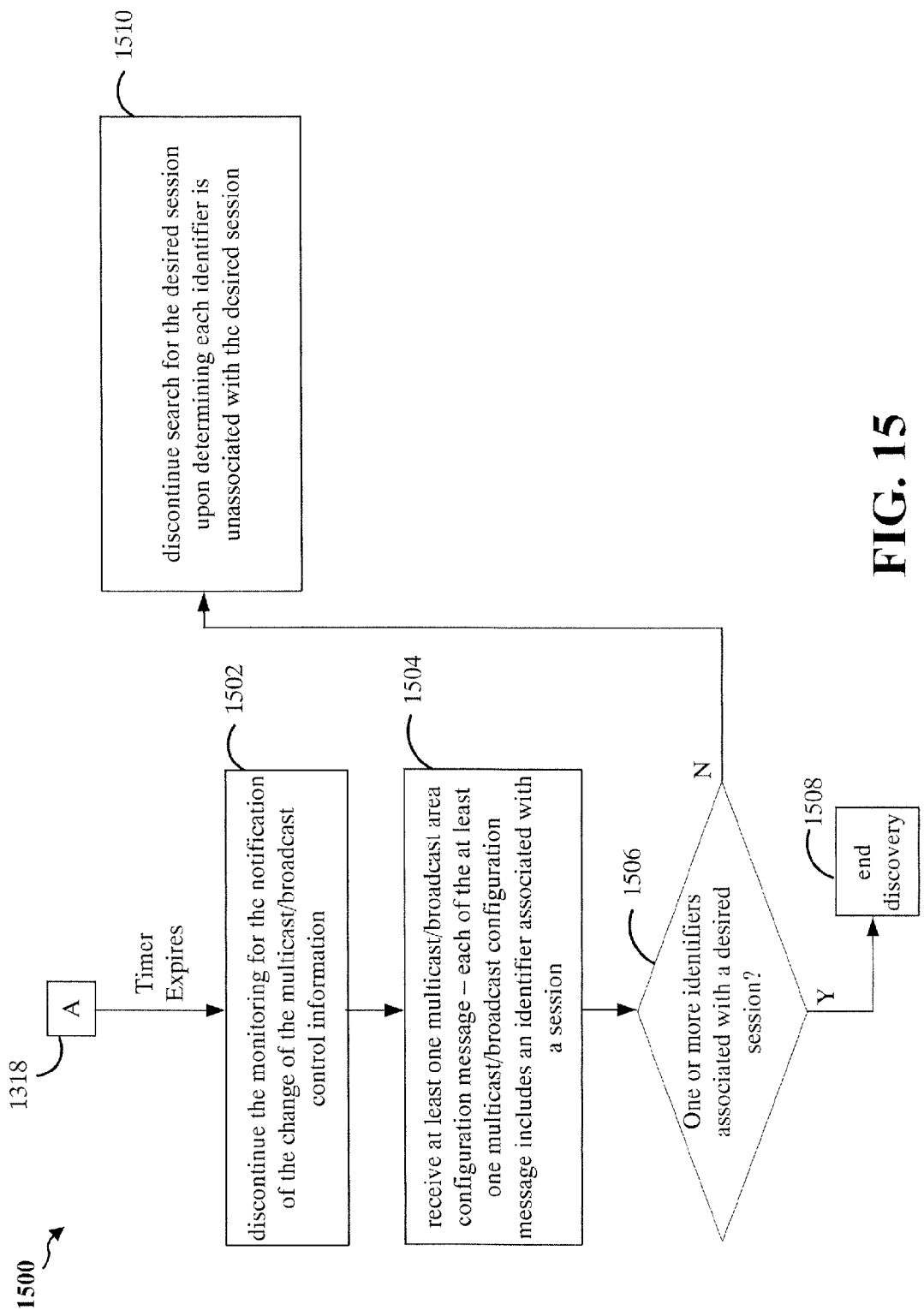
FIG. 15 is a flow chart of a fifth method of wireless communication.

FIG. 15 is a flow chart 1500 of a fifth method of wireless communication. As shown in FIG. 15, after point A 1318 continued from FIG. 13, in step 1502 after expiration of the timer, the UE may discontinue the monitoring for the notification of the change of the multicast/broadcast control information. In step 1504, the UE may receive at least one multicast/broadcast area configuration message. Each of the at least one multicast/broadcast configuration message may include an identifier associated with a session. In step 1506, the UE may determine whether each identifier is associated with a desired session. If an identifier is associated with a desired session, in step 1508, the UE ends discovery. If each identifier is unassociated with a desired session, in step 1510, the UE may discontinue search for the desired session.

For example, as shown in FIG. 9, in step 918 (from 912 or 916), the UE may discontinue the monitoring for the notification of the change of the multicast/broadcast control information. In step 918, the UE may receive at least one multicast/broadcast area configuration message. If the UE determines that an identifier is associated with a desired session, in step 908, the UE ends discovery having found an eMBMS session of interest. If the UE determines that each identifier is unassociated with a desired session, in step 908, the UE ends discovery without having found an eMBMS session of interest.

Figure 16:
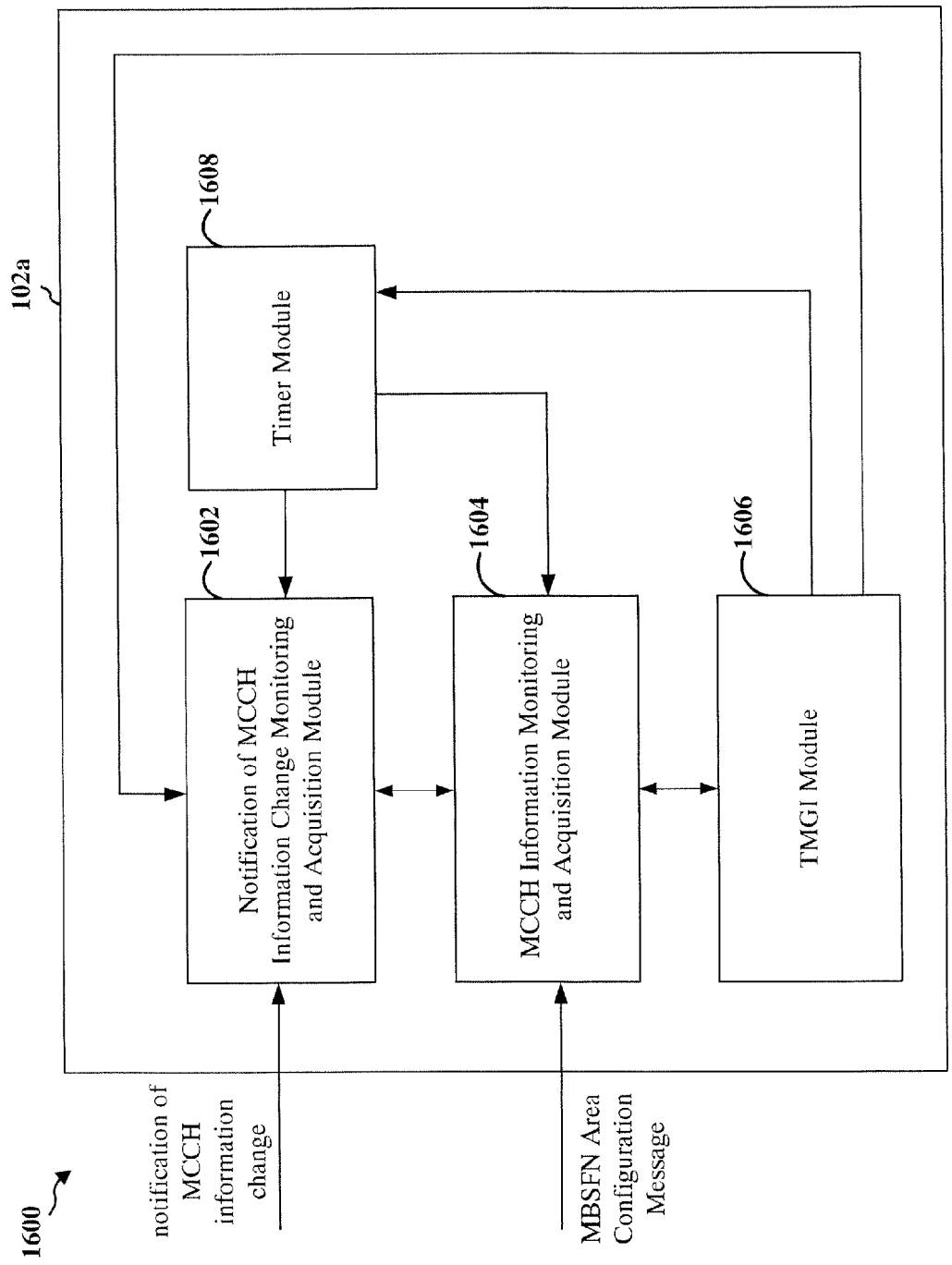
FIG. 16 is a conceptual data flow diagram illustrating the data flow between different modules/means/components in an exemplary apparatus.

FIG. 16 is a conceptual data flow diagram 1600 illustrating the data flow between different modules/means/components in an exemplary apparatus 102*a*. The apparatus includes a notification of MCCH information change monitoring and acquisition module 1602, an MCCH information monitoring and acquisition module 1604, a TMGI module 1606, and a timer module 1608. When the apparatus 102*a* determines to start eMBMS session discovery (e.g., upon entering a multicast/broadcast area), the notification of MCCH information change monitoring and acquisition module 1602 may be configured to monitor for a notification of a change of multicast/broadcast control information associated with the multicast/broadcast area without having previously acquired the multicast/broadcast control information. In addition, the MCCH information monitoring and acquisition module 1604 may be configured to acquire the multicast/broadcast control information while monitoring for the notification of the change of the multicast/broadcast control information.

The MCCH information monitoring and acquisition module 1604 may be configured to receive a first multicast/broadcast area configuration message including an identifier during a current modification period. The identifier is associated with a session. The MCCH information monitoring and acquisition module 1604 provides the identifier to the TMGI module 1606, which may be configured to determine whether the identifier is associated with a desired session. If the identifier is unassociated with a desired session, the TMGI module 1606 informs the MCCH information monitoring and acquisition module 1604 so that the MCCH information monitoring and acquisition module 1604 may monitor for a second multicast/broadcast area configuration message during a subsequent modification period without having previously received the notification of the change of the multicast/broadcast control information.

The MCCH information monitoring and acquisition module 1604 may be configured to receive at least one multicast/broadcast area configuration message for at least one modification period. Each of the at least one multicast/broadcast configuration message includes an identifier associated with a session. The MCCH information monitoring and acquisition module 1604 provides the identifier to the TMGI module 1606, which may be configured to determine whether each identifier is associated with a desired session. Upon determining each identifier is unassociated with the desired session, the TMGI module 1606 informs the MCCH information monitoring and acquisition module 1604 so that the MCCH information monitoring and acquisition module 1604 may refrain from monitoring for additional multicast/broadcast area configuration messages in one or more modification periods subsequent to the at least one modification period.

The MCCH information monitoring and acquisition module 1604 may refrain from monitoring for the additional multicast/broadcast area configuration messages occurs until the notification of the change of the multicast/broadcast control information is received by the notification of MCCH information change monitoring and acquisition module 1602. The timer module 1608 may be configured to start a timer. The MCCH information monitoring and acquisition module 1604 may be configured to monitor for the additional multicast/broadcast area configuration messages until the notification of the change of the multicast/broadcast control information is received by the notification of MCCH information change monitoring and acquisition module 1602 or the timer module 1608 informs the MCCH information monitoring and acquisition module 1604 that the timer has expired.

The timer module 1608 may be configured to start a timer and the notification of MCCH information change monitoring and acquisition module 1602 may be configured to continue to monitor for the notification of the change of the multicast/broadcast control information until the timer module 1608 communicates to the notification of MCCH information change monitoring and acquisition module 1602 that the timer has expired. The notification of MCCH information change monitoring and acquisition module 1602 may be configured to receive the notification of the change of the multicast/broadcast control information during a first modification period and before expiration of the timer. The MCCH information monitoring and acquisition module 1604 may be configured to receive at least one multicast/broadcast area configuration message before expiration of the timer and for a second modification period subsequent to the first modification period. Each of the at least one multicast/broadcast configuration message may include an identifier associated with a session. The MCCH information monitoring and acquisition module 1604 communicates the identifiers to the TMGI module 1606, which determines whether each identifier is associated with a desired session. Upon determining each identifier is unassociated with the desired session, the TMGI module 1606 informs the MCCH information monitoring and acquisition module 1604 that a desired session was not found so that the MCCH information monitoring and acquisition module 1604 may refrain from monitoring for additional multicast/broadcast area configuration messages until a second notification of the change of the multicast/broadcast control information is received or notification of expiration of the timer.

After expiration of the timer, the notification of MCCH information change monitoring and acquisition module 1602 may be configured to discontinue the monitoring for the notification of the change of the multicast/broadcast control information. In addition, the MCCH information monitoring and acquisition module 1604 may be configured to receive at least one multicast/broadcast area configuration message. Each of the at least one multicast/broadcast configuration message may include an identifier associated with a session. The TMGI module 1606 receives the identifiers from the MCCH information monitoring and acquisition module 1604 and determines whether each identifier is associated with a desired session. If each identifier is unassociated with a desired session, the notification of MCCH information change monitoring and acquisition module 1602 and the MCCH information monitoring and acquisition module 1604 discontinue the search for the desired session.

The apparatus may include additional modules that perform each of the steps of the algorithm in the aforementioned flow charts. As such, each step in the aforementioned flow charts may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 17:
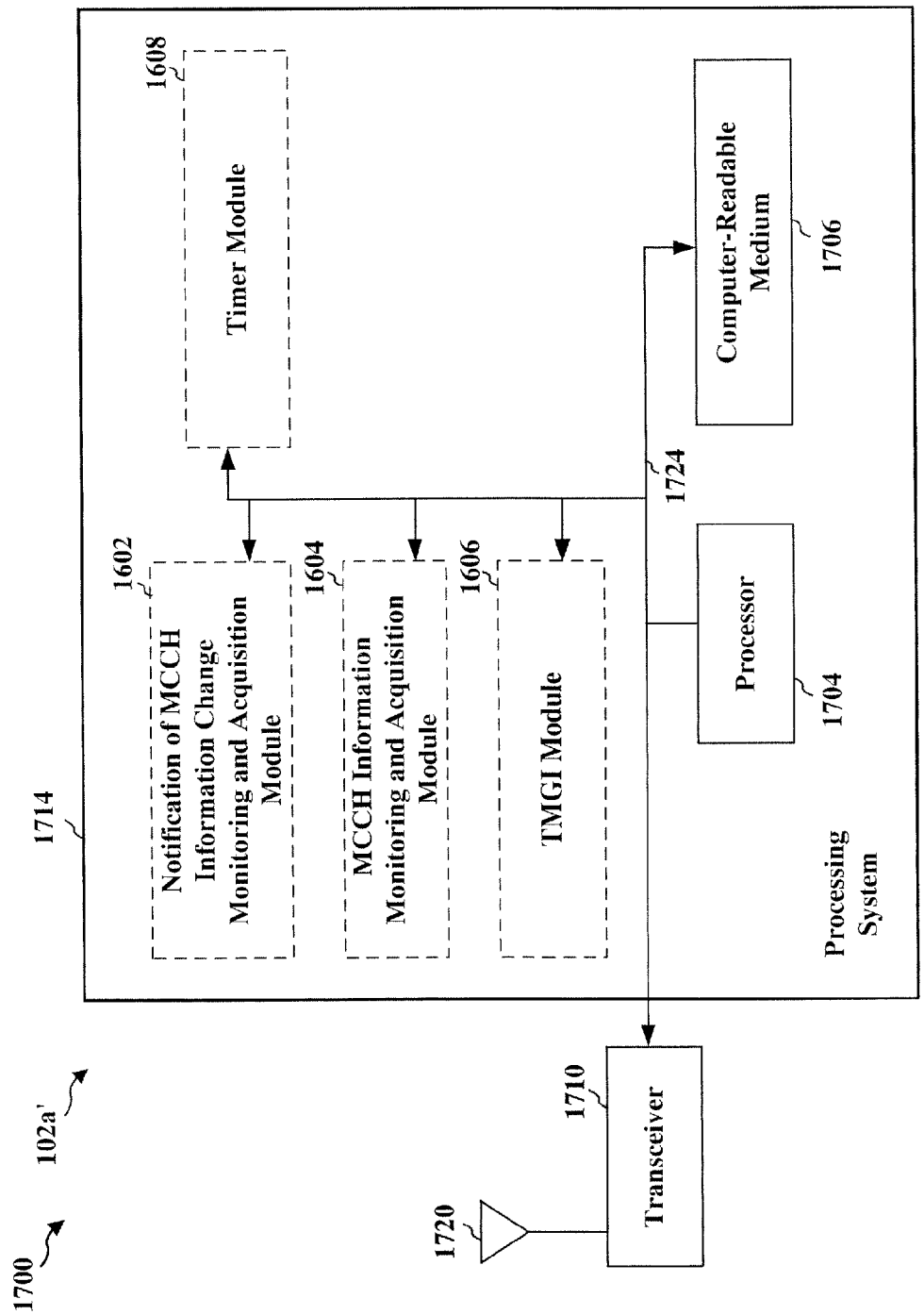
FIG. 17 is a diagram illustrating an example of a hardware implementation for an apparatus employing a processing system.

FIG. 17 is a diagram 1700 illustrating an example of a hardware implementation for an apparatus 102a" employing a processing system 1714. The processing system 1714 may be implemented with a bus architecture, represented generally by the bus 1724. The bus 1724 may include any number of interconnecting buses and bridges depending on the specific application of the processing system 1714 and the overall design constraints. The bus 1724 links together various circuits including one or more processors and/or hardware modules, represented by the processor 1704, the modules 1602, 1604, 1606, 1608, and the computer-readable medium 1706. The bus 1724 may also link various other circuits such as timing sources, peripherals, voltage regulators, and power management circuits, which are well known in the art, and therefore, will not be described any further.

The processing system 1714 may be coupled to a transceiver 1710. The transceiver 1710 is coupled to one or more antennas 1720. The transceiver 1710 provides a means for communicating with various other apparatus over a transmission medium. The processing system 1714 includes a processor 1704 coupled to a computer-readable medium 1706. The processor 1704 is responsible for general processing, including the execution of software stored on the computer-readable medium 1706. The software, when executed by the processor 1704, causes the processing system 1714 to perform the various functions described supra for any particular apparatus. The computer-readable medium 1706 may also be used for storing data that is manipulated by the processor 1704 when executing software. The processing system further includes at least one of the modules 1602, 1604, 1606, and 1608. The modules may be software modules running in the processor 1704, resident/stored in the computer readable medium 1706, one or more hardware modules coupled to the processor 1704, or some combination thereof. The processing system 1714 may be a component of the UE 650 and may include the memory 660 and/or at least one of the TX processor 668, the RX processor 656, and the controller/processor 659.

In one configuration, the apparatus 102a/102a' for wireless communication includes means for monitoring for a notification of a change of multicast/broadcast control information associated with a multicast/broadcast area without having previously acquired the multicast/broadcast control information, and means for acquiring the multicast/broadcast control information while monitoring for the notification of the change of the multicast/broadcast control information. The apparatus may further include means for receiving a first multicast/broadcast area configuration message including an identifier during a current modification period in which the identifier is associated with a session. The apparatus may further include means for determining that the identifier is unassociated with a desired session, and means for monitoring for a second multicast/broadcast area configuration message during a subsequent modification period without having previously received the notification of the change of the multicast/broadcast control information. The apparatus may further include means for receiving at least one multicast/broadcast area configuration message for at least one modification period. Each of the at least one multicast/broadcast configuration message may include an identifier associated with a session. The apparatus may further include means for determining whether each identifier is associated with a desired session, and means for refraining from monitoring for additional multicast/broadcast area configuration messages in one or more modification periods subsequent to said at least one modification period upon determining each identifier is unassociated with the desired session. The apparatus may further include means for starting a timer, and means for continuing to monitor for the notification of the change of the multicast/broadcast control information until expiration of the timer. The apparatus may further include means for receiving the notification of the change of the multicast/broadcast control information during a first modification period and before expiration of the timer. The apparatus may further include means for receiving at least one multicast/broadcast area configuration message before expiration of the timer and for a second modification period subsequent to the first modification period. Each of the at least one multicast/broadcast configuration message may include an identifier associated with a session. The apparatus may further include means for determining whether each identifier is associated with a desired session, and means for refraining from monitoring for additional multicast/broadcast area configuration messages upon determining each identifier is unassociated with the desired session until a second notification of the change of the multicast/broadcast control information is received or expiration of the timer. The apparatus may further include means for discontinuing the monitoring for the notification of the change of the multicast/broadcast control information after expiration of the timer. The apparatus may further include means for receiving at least one multicast/broadcast area configuration message. Each of the at least one multicast/broadcast configuration message may include an identifier associated with a session. The apparatus may further include means for determining whether each identifier is associated with a desired session, and means for discontinuing search for the desired session upon determining each identifier is unassociated with the desired session. The aforementioned means may be one or more of the aforementioned modules of the apparatus 102*a* and/or the processing system 1714 of the apparatus 102*a*' configured to perform the functions recited by the aforementioned means. As described supra, the processing system 1714 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication, comprising:
receiving a first multicast/broadcast area configuration message including an identifier during a modification period, the identifier being associated with a session;
determining if the identifier is associated with a desired session;
monitoring, during a modification period, for a notification of a change of a multicast/broadcast control information associated with a multicast/broadcast area without having previously acquired any multicast/broadcast control information during the modification period when it is determined that the identifier is unassociated with a desired session; and
acquiring the multicast/broadcast control information during the modification period while monitoring for the notification of the change of the multicast/broadcast control information during the modification period.

2. The method of claim 1, further comprising:
determining that the identifier is unassociated with a desired session; and
monitoring for a second multicast/broadcast area configuration message during a subsequent modification period without having previously received the notification of the change of the multicast/broadcast control information.

3. The method of claim 1, wherein the first multicast/broadcast area configuration message comprises a plurality of multicast/broadcast area configuration messages for at least one modification period, each of the plurality of multicast/broadcast area configuration messages including the identifier associated with the session, the method further comprising:
determining whether the identifier included in each of the plurality of multicast/broadcast area configuration messages is associated with the desired session; and
refraining from monitoring for additional multicast/broadcast area configuration messages in one or more modification periods subsequent to said at least one modification period upon determining each identifier is unassociated with the desired session.

4. The method of claim 3, wherein the refraining from monitoring for the additional multicast/broadcast area configuration messages occurs until the notification of the change of the multicast/broadcast control information is received.

5. The method of claim 3, further comprising starting a timer, wherein the refraining from monitoring for the additional multicast/broadcast area configuration messages occurs until the notification of the change of the multicast/broadcast control information is received or the timer expires.

6. The method of claim 1, further comprising:
starting a timer; and
continuing to monitor for the notification of the change of the multicast/broadcast control information until expiration of the timer.

7. The method of claim 6, further comprising:
receiving the notification of the change of the multicast/broadcast control information during a first modification period and before expiration of the timer;
receiving at least one multicast/broadcast area configuration message before expiration of the timer and for a second modification period subsequent to the first modification period, each of the at least one multicast/broadcast configuration message including an identifier associated with a session;
determining whether each identifier is associated with the desired session; and
refraining from monitoring for additional multicast/broadcast area configuration messages upon determining each identifier is unassociated with the desired session until a second notification of the change of the multicast/broadcast control information is received or expiration of the timer.

8. The method of claim 6, further comprising:
discontinuing the monitoring for the notification of the change of the multicast/broadcast control information after expiration of the timer;
determining whether each identifier is associated with the desired session; and
discontinuing search for the desired session upon determining each identifier is unassociated with the desired session.

9. The method of claim 1, wherein the multicast/broadcast control information is received in a multicast/broadcast area configuration message in a multicast control channel (MCCH).

10. The method of claim 1, wherein the multicast/broadcast control information is associated with an evolved Multimedia Broadcast Multicast Service (eMBMS).

11. The method of claim 1, further comprising entering a multicast/broadcast area, wherein the monitoring and the acquiring occurs upon entering the multicast/broadcast area.

12. An apparatus for wireless communication, comprising:
means for receiving a first multicast/broadcast area configuration message including an identifier during a modification period, the identifier being associated with a session;
means for determining if the identifier is associated with a desired session;
means for monitoring, during a modification period, for a notification of a change of a multicast/broadcast control information associated with a multicast/broadcast area without having previously acquired any multicast/broadcast control information during the modification period when it is determined that the identifier is unassociated with a desired session; and
means for acquiring the multicast/broadcast control information during the modification period while monitoring for the notification of the change of the multicast/broadcast control information during the modification period.

13. The apparatus of claim 12, further comprising:
means for determining that the identifier is unassociated with a desired session; and
means for monitoring for a second multicast/broadcast area configuration message during a subsequent modification period without having previously received the notification of the change of the multicast/broadcast control information.

14. The apparatus of claim 12, wherein the first multicast/broadcast area configuration message comprises a plurality of multicast/broadcast area configuration messages for at least one modification period, each of the plurality of multicast/broadcast area configuration messages including the identifier associated with the session, the apparatus further comprising:
means for determining whether the identifier included in each of the plurality of multicast/broadcast area configuration messages is associated with the desired session; and
means for refraining from monitoring for additional multicast/broadcast area configuration messages in one or more modification periods subsequent to said at least one modification period upon determining each identifier is unassociated with the desired session.

15. The apparatus of claim 14, wherein the means for refraining from monitoring for the additional multicast/broadcast area configuration messages is configured to refrain from monitoring until the notification of the change of the multicast/broadcast control information is received.

16. The apparatus of claim 14, further comprising means for starting a timer, wherein the means for refraining from monitoring for the additional multicast/broadcast area configuration messages is configured to refrain from monitoring until the notification of the change of the multicast/broadcast control information is received or the timer expires.

17. The apparatus of claim 12, further comprising:
means for starting a timer; and
means for continuing to monitor for the notification of the change of the multicast/broadcast control information until expiration of the timer.

18. The apparatus of claim 17, further comprising:
means for receiving the notification of the change of the multicast/broadcast control information during a first modification period and before expiration of the timer;
means for receiving the first multicast/broadcast area configuration message before expiration of the timer and for a second modification period subsequent to the first modification period, each of the at least one multicast/broadcast configuration message including an identifier associated with the session;
means for determining whether each identifier is associated with a desired session; and
means for refraining from monitoring for additional multicast/broadcast area configuration messages upon determining each identifier is unassociated with the desired session until a second notification of the change of the multicast/broadcast control information is received or expiration of the timer.

19. The apparatus of claim 17, further comprising:
means for discontinuing the monitoring for the notification of the change of the multicast/broadcast control information after expiration of the timer;
means for determining whether each identifier is associated with the desired session; and
means for discontinuing search for the desired session upon determining each identifier is unassociated with the desired session.

20. The apparatus of claim 12, wherein the multicast/broadcast control information is received in a multicast/broadcast area configuration message in a multicast control channel (MCCH).

21. The apparatus of claim 12, wherein the multicast/broadcast control information is associated with an evolved Multimedia Broadcast Multicast Service (eMBMS).

22. The apparatus of claim 12, wherein the means for monitoring for the notification of the change of the multicast/broadcast control information starts monitoring upon entering the multicast/broadcast area, and the means for acquiring the multicast/broadcast control information starts acquiring upon entering the multicast/broadcast area.

23. An apparatus for wireless communication, comprising:
a memory; and
a processing system coupled to the memory and configured to:
receive a first multicast/broadcast area configuration message including an identifier during a modification period, the identifier being associated with a session;
determine if the identifier is associated with a desired session;
monitor, during a modification period, for a notification of a change of a multicast/broadcast control information associated with a multicast/broadcast area without having previously acquired any multicast/broadcast control information during the modification period when it is determined that the identifier is unassociated with a desired session; and
acquire the multicast/broadcast control information during the modification period while monitoring for the notification of the change of the multicast/broadcast control information during the modification period.

24. The apparatus of claim 23, wherein the processing system is further configured to:
determine that the identifier is unassociated with a desired session; and
monitor for a second multicast/broadcast area configuration message during a subsequent modification period without having previously received the notification of the change of the multicast/broadcast control information.

25. The apparatus of claim 23, wherein the first multicast/broadcast area configuration message comprises a plurality of multicast/broadcast area configuration messages for at least one modification period, each of the plurality of multicast/broadcast area configuration messages including the identifier associated with the session, and wherein the processing system is further configured to:
determine whether the identifier included in each of the plurality of multicast/broadcast area configuration messages is associated with the desired session; and
refrain from monitoring for additional multicast/broadcast area configuration messages in one or more modification periods subsequent to said at least one modification period upon determining each identifier is unassociated with the desired session.

26. The apparatus of claim 25, wherein the processing system is configured to refrain from monitoring for the additional multicast/broadcast area configuration messages until the notification of the change of the multicast/broadcast control information is received.

27. The apparatus of claim 25, wherein the processing system is further configured to start a timer, wherein the processing system is configured to refrain from monitoring for the additional multicast/broadcast area configuration messages until the notification of the change of the multicast/broadcast control information is received or the timer expires.

28. The apparatus of claim 23, wherein the processing system is further configured to:
start a timer; and
continue to monitor for the notification of the change of the multicast/broadcast control information until expiration of the timer.

29. The apparatus of claim 28, wherein the processing system is further configured to:
receive the notification of the change of the multicast/broadcast control information during a first modification period and before expiration of the timer;
receive the first at least one multicast/broadcast area configuration message before expiration of the timer and for a second modification period subsequent to the first modification period, each of the at least one multicast/broadcast configuration message including the identifier associated with the session;
determine whether each identifier is associated with a desired session; and
refrain from monitoring for additional multicast/broadcast area configuration messages upon determining each identifier is unassociated with the desired session until a second notification of the change of the multicast/broadcast control information is received or expiration of the timer.

30. The apparatus of claim 28, wherein the processing system is further configured to:
discontinue the monitoring for the notification of the change of the multicast/broadcast control information after expiration of the timer;
determine whether each identifier is associated with the desired session; and
discontinue search for the desired session upon determining each identifier is unassociated with the desired session.

31. The apparatus of claim 23, wherein the multicast/broadcast control information is received in a multicast/broadcast area configuration message in a multicast control channel (MCCH).

32. The apparatus of claim 23, wherein the multicast/broadcast control information is associated with an evolved Multimedia Broadcast Multicast Service (eMBMS).

33. The apparatus of claim 23, wherein the processing system is configured to start monitoring for the notification of the change of the multicast/broadcast control information and to start acquiring the multicast/broadcast control information upon entering the multicast/broadcast area.

34. A non-transitory computer-readable medium comprising code for:
receiving a first multicast/broadcast area configuration message including an identifier during a modification period, the identifier being associated with a session;
determining if the identifier is associated with a desired session;
monitoring, during a modification period, for a notification of a change of a multicast/broadcast control information associated with a multicast/broadcast area without having previously acquired any multicast/broadcast control information during the modification period when it is determined that the identifier is unassociated with a desired session; and
acquiring the multicast/broadcast control information during the modification period while monitoring for the notification of the change of the multicast/broadcast control information during the modification period.

35. The non-transitory computer-readable medium of claim 34, further comprising code for:
- determining that the identifier is unassociated with a desired session; and
- monitoring for a second multicast/broadcast area configuration message during a subsequent modification period without having previously received the notification of the change of the multicast/broadcast control information.

36. The non-transitory computer-readable medium of claim 34, wherein the first multicast/broadcast area configuration message comprises a plurality of multicast/broadcast area configuration messages for at least one modification period, each of the plurality of multicast/broadcast area configuration messages including the identifier associated with the session, further comprising code for:
- determining whether the identifier included in each of the plurality of multicast/broadcast area configuration messages is associated with the desired session; and
- refraining from monitoring for additional multicast/broadcast area configuration messages in one or more modification periods subsequent to said at least one modification period upon determining each identifier is unassociated with the desired session.

37. The non-transitory computer-readable medium of claim 36, wherein the code for refraining from monitoring for the additional multicast/broadcast area configuration messages refrains from monitoring until the notification of the change of the multicast/broadcast control information is received.

38. The non-transitory computer-readable medium of claim 36, further comprising code for starting a timer, wherein the code for refraining from monitoring for the additional multicast/broadcast area configuration messages refrains from monitoring until the notification of the change of the multicast/broadcast control information is received or the timer expires.

39. The non-transitory computer-readable medium of claim 34, further comprising code for:
- starting a timer; and
- continuing to monitor for the notification of the change of the multicast/broadcast control information until expiration of the timer.

40. The non-transitory computer-readable medium of claim 39, further comprising code for:
- receiving the notification of the change of the multicast/broadcast control information during a first modification period and before expiration of the timer;
- receiving the first at least one multicast/broadcast area configuration message before expiration of the tinier and for a second modification period subsequent to the first modification period, each of the at least one multicast/broadcast configuration message including the identifier associated with the session;
- determining whether each identifier is associated with the desired session; and
- refraining from monitoring for additional multicast/broadcast area configuration messages upon determining each identifier is unassociated with the desired session until a second notification of the change of the multicast/broadcast control information is received or expiration of the timer.

41. The non-transitory computer-readable medium of claim 39, further comprising code for:
- discontinuing the monitoring for the notification of e change of e multicast/broadcast control information after expiration of the timer;
- determining whether each identifier is associated with the desired session; and
- discontinuing search for the desired session upon determining each identifier is unassociated with the desired session.

42. The non-transitory computer-readable medium of claim 34, wherein the multicast/broadcast control information is received in a multicast/broadcast area configuration message in a multicast control channel (MCCH).

43. The non-transitory computer-readable medium of claim 34, wherein the multicast/broadcast control information is associated with an evolved Multimedia Broadcast Multicast Service (eMBMS).

44. The non-transitory computer-readable medium of claim 34, wherein the code for monitoring for the notification of the change of the multicast/broadcast control information starts monitoring upon entering the multicast/broadcast area, and the code for acquiring the multicast/broadcast control information starts acquiring upon entering the multicast/broadcast area.

* * * * *